US012587479B2

(12) United States Patent
Kabbani et al.

(10) Patent No.: US 12,587,479 B2
(45) Date of Patent: Mar. 24, 2026

(54) ROUND-TRIP TIME AND EXPLICIT CONGESTION NOTIFICATION SIGNALS FOR BANDWIDTH UTILIZATION

(71) Applicant: MICROSOFT TECHNOLOGY LICENSING, LLC, Redmond, WA (US)

(72) Inventors: Abdul Kabbani, Redmond, WA (US); Torsten Hoefler, Pfaeffikon (CH)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/508,036

(22) Filed: Nov. 13, 2023

(65) Prior Publication Data

US 2025/0047613 A1     Feb. 6, 2025

Related U.S. Application Data

(60) Provisional application No. 63/531,000, filed on Aug. 6, 2023, provisional application No. 63/517,917, filed
(Continued)

(51) Int. Cl.
| | |
|---|---|
| *H04L 47/125* | (2022.01) |
| *H04L 47/10* | (2022.01) |
(Continued)

(52) U.S. Cl.
CPC ............ *H04L 47/125* (2013.01); *H04L 47/11* (2013.01); *H04L 47/115* (2013.01); *H04L 47/12* (2013.01);
(Continued)

(58) Field of Classification Search
CPC ........... H04L 47/27; H04L 47/11; H04L 47/43
See application file for complete search history.

(56) References Cited

U.S. PATENT DOCUMENTS

| | | | |
|---|---|---|---|
| 6,105,064 | A | 8/2000 | Davis |
| 6,614,755 | B1 | 9/2003 | Dote |
(Continued)

FOREIGN PATENT DOCUMENTS

| | | |
|---|---|---|
| CN | 113411264 A | 9/2021 |
| CN | 115314442 A | 11/2022 |
(Continued)

OTHER PUBLICATIONS

Alibaba, et al., "MPLS Segment Routing Over IP; rfc8663.txt", Internet Engineering Task Force, IETF; Standard, Internet Society (ISOC) 4, Rue Des Falaises CH—1205 Geneva, Switzerland, Dec. 6, 2019, Retrieved from URL: https://tools.ietf.org/html/rfc8663, [Retrieved on Dec. 6, 2019], pp. 1-10.
(Continued)

*Primary Examiner* — Chirag R Patel
(74) *Attorney, Agent, or Firm* — Han Gim; Newport IP, LLC

(57) ABSTRACT

Acknowledgement messages for a link in a computing network are accessed. Round trip time (RTT) measurements for the link are accessed. In response to determining that none of the acknowledgement messages are Explicit Congestion Notification (ECN)-marked and none of the accessed RTT measurements exceeded a minimum expected latency threshold, it is determined that an end-to-end path of the link is not congested.

20 Claims, 24 Drawing Sheets

Related U.S. Application Data on Aug. 6, 2023, provisional application No. 63/517,919, filed on Aug. 6, 2023, provisional application No. 63/530,991, filed on Aug. 6, 2023, provisional application No. 63/530,992, filed on Aug. 6, 2023, provisional application No. 63/517,918, filed on Aug. 6, 2023, provisional application No. 63/530,997, filed on Aug. 6, 2023.

(51) Int. Cl.

| | |
|---|---|
| *H04L 47/11* | (2022.01) |
| *H04L 47/12* | (2022.01) |
| *H04L 47/24* | (2022.01) |
| *H04L 47/263* | (2022.01) |
| *H04L 47/27* | (2022.01) |
| *H04L 47/30* | (2022.01) |
| *H04L 47/33* | (2022.01) |
| *H04L 47/43* | (2022.01) |
| *H04L 47/62* | (2022.01) |

(52) U.S. Cl.
CPC .............. *H04L 47/18* (2013.01); *H04L 47/24* (2013.01); *H04L 47/263* (2013.01); *H04L 47/27* (2013.01); *H04L 47/30* (2013.01); *H04L 47/33* (2013.01); *H04L 47/43* (2022.05); *H04L 47/6225* (2013.01); *H04L 47/6245* (2013.01)

(56) References Cited

U.S. PATENT DOCUMENTS

| | | | |
|---|---|---|---|
| 6,839,321 | B1 | 1/2005 | Chiruvolu |
| 6,850,488 | B1 | 2/2005 | Wesley |
| 6,996,062 | B1 | 2/2006 | Freed |
| 7,092,357 | B1 | 8/2006 | Ye |
| 7,957,293 | B2 | 6/2011 | Mayhew |
| 8,443,072 | B1 | 5/2013 | Orbach |
| 8,904,034 | B2 | 12/2014 | Song |
| 9,112,797 | B2 | 8/2015 | Ludwig |
| 9,185,036 | B2 | 11/2015 | Malhotra |
| 9,444,739 | B2 | 9/2016 | Huysegems |
| 9,473,408 | B1 | 10/2016 | Kabbani |
| 9,544,233 | B2 | 1/2017 | Ansari |
| 9,654,399 | B2 | 5/2017 | Liu |
| 9,692,696 | B2 | 6/2017 | Decusatis |
| 11,575,609 | B2 | 2/2023 | Srinivasan |
| 11,616,723 | B2 | 3/2023 | Friedman |
| 11,621,918 | B2 | 4/2023 | Friedman |
| 12,224,940 | B2 | 2/2025 | Musleh |
| 2002/0141341 | A1 | 10/2002 | Haggar |
| 2004/0109443 | A1 | 6/2004 | Gai |
| 2006/0193261 | A1 | 8/2006 | Sethi |
| 2006/0203728 | A1 | 9/2006 | Kwan |
| 2006/0203730 | A1 | 9/2006 | Zur |
| 2006/0256784 | A1 | 11/2006 | Feng |
| 2008/0037420 | A1 | 2/2008 | Tang |
| 2008/0239948 | A1 | 10/2008 | Bai |
| 2009/0245112 | A1 | 10/2009 | Okazaki |
| 2009/0310610 | A1 | 12/2009 | Sandstrom |
| 2010/0061251 | A1* | 3/2010 | Nassor .................... H04L 47/26 |
| | | | 370/242 |
| 2010/0118703 | A1 | 5/2010 | Mayhew |
| 2011/0116512 | A1 | 5/2011 | Crupnicoff |
| 2011/0205898 | A1 | 8/2011 | Ichiki |
| 2012/0120801 | A1 | 5/2012 | Ramakrishnan |
| 2012/0185594 | A1 | 7/2012 | Huysegems |
| 2013/0232228 | A1 | 9/2013 | Ramamurthy |
| 2013/0308455 | A1 | 11/2013 | Kapadia |
| 2014/0112128 | A1 | 4/2014 | Kwan |
| 2014/0226473 | A1 | 8/2014 | Jin |
| 2014/0321289 | A1 | 10/2014 | Liu |
| 2015/0029849 | A1 | 1/2015 | Frost |
| 2015/0131446 | A1 | 5/2015 | Kwan |
| 2015/0172075 | A1 | 6/2015 | Decusatis |
| 2017/0019803 | A1 | 1/2017 | Nguyen |
| 2017/0324629 | A1 | 11/2017 | Iyer |
| 2019/0044861 | A1 | 2/2019 | Wandler |
| 2019/0116122 | A1 | 4/2019 | Friedman |
| 2020/0236052 | A1 | 7/2020 | Srinivasan |
| 2020/0366608 | A1 | 11/2020 | Pan |
| 2021/0119930 | A1 | 4/2021 | Debbage et al. |
| 2021/0297350 | A1 | 9/2021 | Vegesna et al. |
| 2021/0297351 | A1 | 9/2021 | Vegesna et al. |
| 2021/0320820 | A1 | 10/2021 | Ruan et al. |
| 2021/0328930 | A1 | 10/2021 | Nikolaidis |
| 2021/0344782 | A1 | 11/2021 | Shpigelman |
| 2022/0078118 | A1 | 3/2022 | Ao |
| 2022/0085916 | A1 | 3/2022 | Debbage |
| 2022/0182324 | A1 | 6/2022 | Raman |
| 2022/0210075 | A1 | 6/2022 | Musleh |
| 2022/0210097 | A1 | 6/2022 | Yang |
| 2022/0311711 | A1 | 9/2022 | Jepsen |
| 2022/0368633 | A1 | 11/2022 | Liu |
| 2023/0198895 | A1 | 6/2023 | Amir |
| 2023/0246966 | A1 | 8/2023 | Sun |
| 2023/0269184 | A1 | 8/2023 | Zemach |
| 2023/0336490 | A1 | 10/2023 | Arslan |
| 2023/0362099 | A1 | 11/2023 | Tilmans |
| 2024/0396839 | A1 | 11/2024 | Friedman |
| 2024/0414093 | A1* | 12/2024 | Sah .................... H04L 43/0841 |
| 2024/0430200 | A1* | 12/2024 | Zhao ..................... H04L 47/12 |
| 2025/0047598 | A1 | 2/2025 | Kabbani |
| 2025/0047600 | A1 | 2/2025 | Kabbani |
| 2025/0047603 | A1 | 2/2025 | Kabbani |
| 2025/0047604 | A1 | 2/2025 | Kabbani |
| 2025/0047610 | A1 | 2/2025 | Kabbani |
| 2025/0047616 | A1 | 2/2025 | Hoefler |
| 2025/0055797 | A1 | 2/2025 | Gary |

FOREIGN PATENT DOCUMENTS

| | | |
|---|---|---|
| CN | 117527698 A | 2/2024 |
| CN | 117692396 A | 4/2024 |
| WO | 0189160 A1 | 11/2001 |
| WO | 2020236297 A1 | 11/2020 |
| WO | 2021238799 A1 | 12/2021 |

OTHER PUBLICATIONS

Alipio, et al., "TCP incast solutions in data center networks: A classification and survey", Journal of network and computer applications, vol. No. 146, Aug. 8, 2019, 28 Pages.

Hu, et al., "Coding-Based Distributed Congestion-Aware Packet Spraying to Avoid Reordering in Data Center Networks", IEEE Access, vol. 9, Mar. 1, 2021, pp. 35539-35548.

International Search Report and Written Opinion Issued in PCT Application No. PCT/US2024/039446, Mailed on Nov. 14, 2024, 13 Pages.

International Search Report and Written Opinion received for PCT Application No. PCT/US2024/039444, Nov. 13, 2024, 13 pages.

International Search Report and Written Opinion received for PCT Application No. PCT/US2024/039445, Nov. 12, 2024, 16 pages.

International Search Report and Written Opinion received for PCT Application No. PCT/US2024/039447, Nov. 18, 2024, 16 pages.

Invitation to Pay Additional Fees received for PCT Application No. PCT/US2024/039449, Nov. 13, 2024, 12 pages.

Kabbani et al., "AF-QCN: Approximate Fairness With Quantized Congestion Notification for Multi-tenanted Data Centers," 2010 18th IEEE Symposium on High Performance Interconnects. IEEE, 2010, pp. 58-65.

Key, et al., "Combining Multipath Routing and Congestion Control for Robustness", 40th Annual Conference on Information Sciences and Systems—IEEE, Mar. 22, 2006, 07 pages.

Non-Final Office Action mailed on Dec. 16, 2024, in U.S. Appl. No. 18/507,788, 12 pages.

Non-Final Office Action mailed on Dec. 2, 2024, in U.S. Appl. No. 18/507,707, 14 pages.

(56)     References Cited

OTHER PUBLICATIONS

Adams, et al., "Active Queue Management: A Survey", IEEE Communications Surveys & Tutorials, vol. 15, No. 3, 2013, pp. 1425-1476.

Choi, et al., "On Fair Window Control for TCP With ECN Using Congestion Level", IEICE Transaction on Communication, vol. E68-B, No. 12, Dec. 2003, pp. 3651-3654.

Floyd, Sally, "TCP and Explicit Congestion Notification", ACM SIGCOMM—Computer Communication Review, 1994, pp. 8-23.

Gilad, et al., "MPCC Online Learning Multipath Transport", Proceedings of the IEEE/ACM 42nd International Conference on Software Engineering Workshops, ACMPUB27, New York, NY, USA, Nov. 23, 2020, pp. 121-135.

International Search Report and Written Opinion received for PCT Application No. PCT/US2024/039448, mailed on Oct. 10, 2024, 18 pages.

International Search Report and Written Opinion received for PCT Application No. PCT/US2024/039450, Oct. 14, 2024, 17 pages.

Karandikar, et al., "TCP rate control", ACM SIGCOMM—Computer Communication Review, 2000, pp. 45-58.

Karnik, et al., "Performance of TCP congestion control with explicit rate feedback", IEEE /ACM Transactions on Networking, vol. 13, No. 1, Feb. 2005, pp. 108-120.

Notice of Allowance mailed on Oct. 24, 2024, in U.S. Appl. No. 18/508,137, 8 pages.

Tang, et al., "Tuning Target Delay for RTT-based Congestion Control", 2022 IEEE 30th International Conference on Network Protocols (ICNP), IEEE, Oct. 30, 2022, pp. 1-11.

International Search Report and Written Opinion received for PCT Application No. PCT/US2024/039449, Jan. 9, 2025, 20 pages.

Non-Final Office Action mailed on Jan. 8, 2025, in U.S. Appl. No. 18/507,831, 14 pages.

Final Office Action mailed on Apr. 15, 2025, in U.S. Appl. No. 18/507,788, 13 pages.

Final Office Action mailed on Mar. 27, 2025, in U.S. Appl. No. 18/507,707, 14 pages.

Notice of Allowance mailed on Mar. 26, 2025, in U.S. Appl. No. 18/508,128 10 pages.

U.S. Appl. No. 63/530,991, filed Aug. 6, 2023.

U.S. Appl. No. 63/530,992, filed Aug. 6, 2023.

U.S. Appl. No. 63/530,997, filed Aug. 6, 2023.

U.S. Appl. No. 63/531,000, filed Aug. 6, 2023.

U.S. Appl. No. 63/517,917, filed Aug. 6, 2023.

U.S. Appl. No. 63/517,918, filed Aug. 6, 2023.

U.S. Appl. No. 63/517,919, filed Aug. 6, 2023.

International Search Report and Written Opinion received for PCT Application No. PCT/US2024/039448, mailed on Sep. 12, 2025, 18 pages.

Matsuda, et al., "Active ECN Mechanism for Fairness Among TCP Sessions with Different Round Trip Times", IEICE Transaction on Communication, Communications Society, vol. E87-B, No. 10, Oct. 1, 2004, pp. 2931-2938.

Final Office Action mailed on Jul. 15, 2025, in U.S. Appl. No. 18/507,831, 16 pages.

Malekpour, et al., "End-to-End Congestion Control for Content-Based Networks", 2014 IEEE 33rd International Symposium on Reliable Distributed Systems, Oct. 2014, pp. 221-231.

Menikkumbura, et al., "Congestion Control for Datacenter Networks: A Control-Theoretic Approach", IEEE Transactions on Parallel and Distributed Systems, vol. 34, Issue No. 5, May 2023, pp. 1682-1696.

Non-Final Office Action mailed on Aug. 22, 2025, in U.S. Appl. No. 18/507,788, 13 pages.

Notice of Allowance mailed on Jun. 23, 2025, in U.S. Appl. No. 18/507,707, 14 pages.

Non-Final Office Action mailed on Nov. 14, 2025, in U.S. Appl. No. 18/508,069, 09 pages.

Notice of Allowance mailed on Nov. 26, 2025, in U.S. Appl. No. 18/507,831 6 pages.

Gao, et al., "Congestion Control Algorithm for Data Center," Asia-Pacific Services Computing Conference, 2014, pp. 156-161.

Li, et al., "Stability and control of network congestion control system," Chinese Control and Decision Conference, 2009, pp. 381-384.

* cited by examiner

RTT: Node A→Node D
(Route: A→1→2→D)

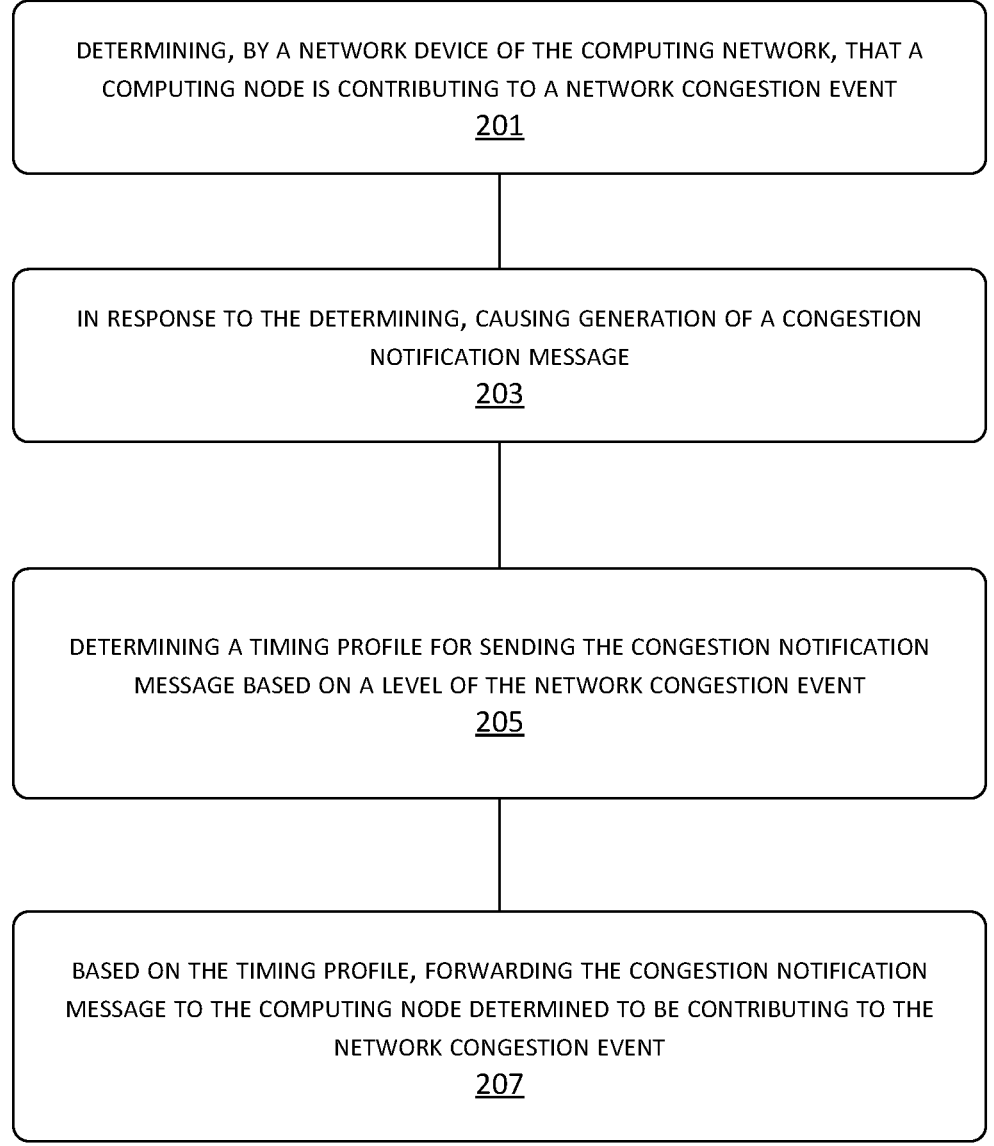

DETERMINING, BY A NETWORK DEVICE OF THE COMPUTING NETWORK, THAT A COMPUTING NODE IS CONTRIBUTING TO A NETWORK CONGESTION EVENT
201

IN RESPONSE TO THE DETERMINING, CAUSING GENERATION OF A CONGESTION NOTIFICATION MESSAGE
203

DETERMINING A TIMING PROFILE FOR SENDING THE CONGESTION NOTIFICATION MESSAGE BASED ON A LEVEL OF THE NETWORK CONGESTION EVENT
205

BASED ON THE TIMING PROFILE, FORWARDING THE CONGESTION NOTIFICATION MESSAGE TO THE COMPUTING NODE DETERMINED TO BE CONTRIBUTING TO THE NETWORK CONGESTION EVENT
207

Figure 2B:
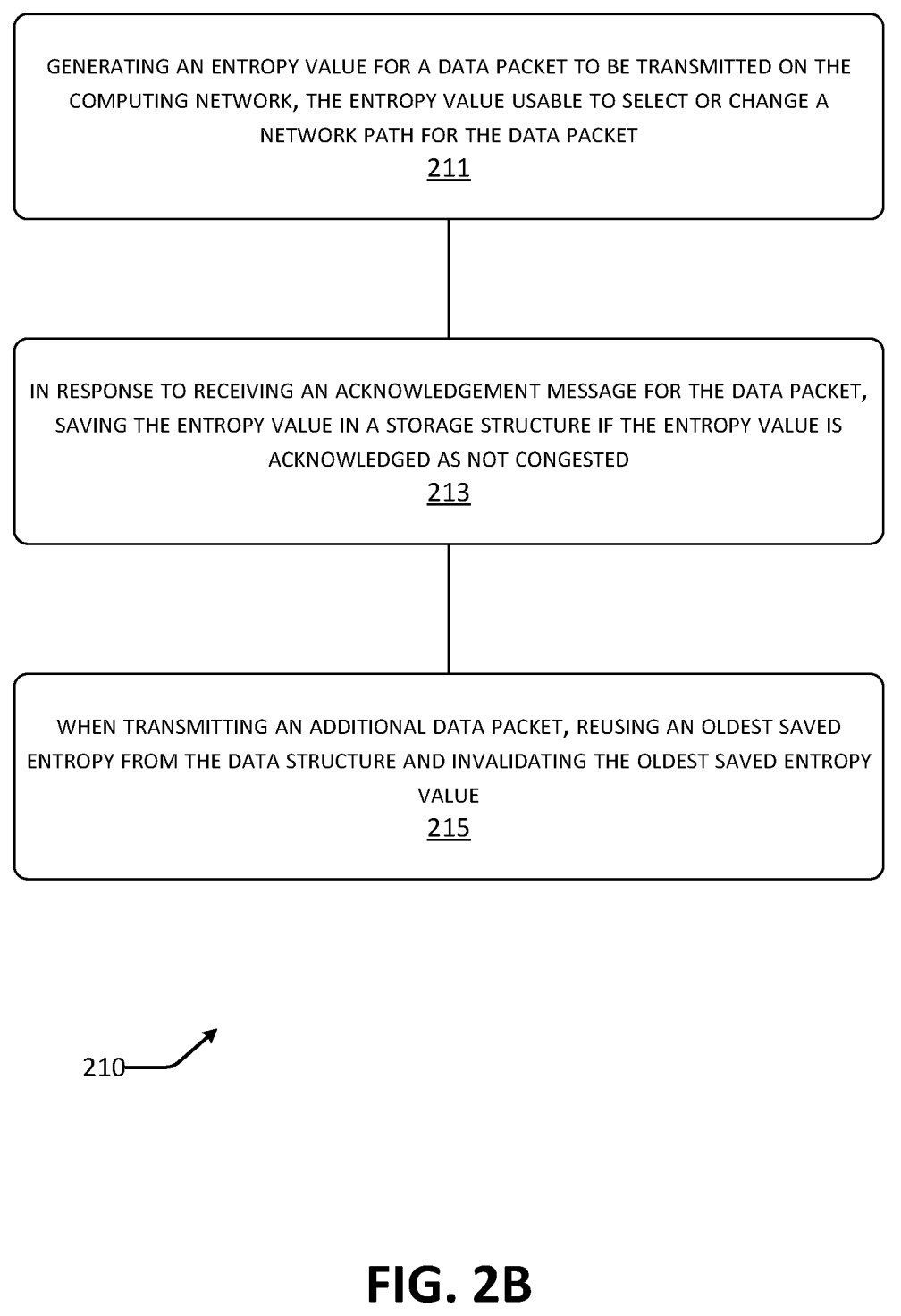

GENERATING AN ENTROPY VALUE FOR A DATA PACKET TO BE TRANSMITTED ON THE COMPUTING NETWORK, THE ENTROPY VALUE USABLE TO SELECT OR CHANGE A NETWORK PATH FOR THE DATA PACKET
211

IN RESPONSE TO RECEIVING AN ACKNOWLEDGEMENT MESSAGE FOR THE DATA PACKET, SAVING THE ENTROPY VALUE IN A STORAGE STRUCTURE IF THE ENTROPY VALUE IS ACKNOWLEDGED AS NOT CONGESTED
213

WHEN TRANSMITTING AN ADDITIONAL DATA PACKET, REUSING AN OLDEST SAVED ENTROPY FROM THE DATA STRUCTURE AND INVALIDATING THE OLDEST SAVED ENTROPY VALUE
215

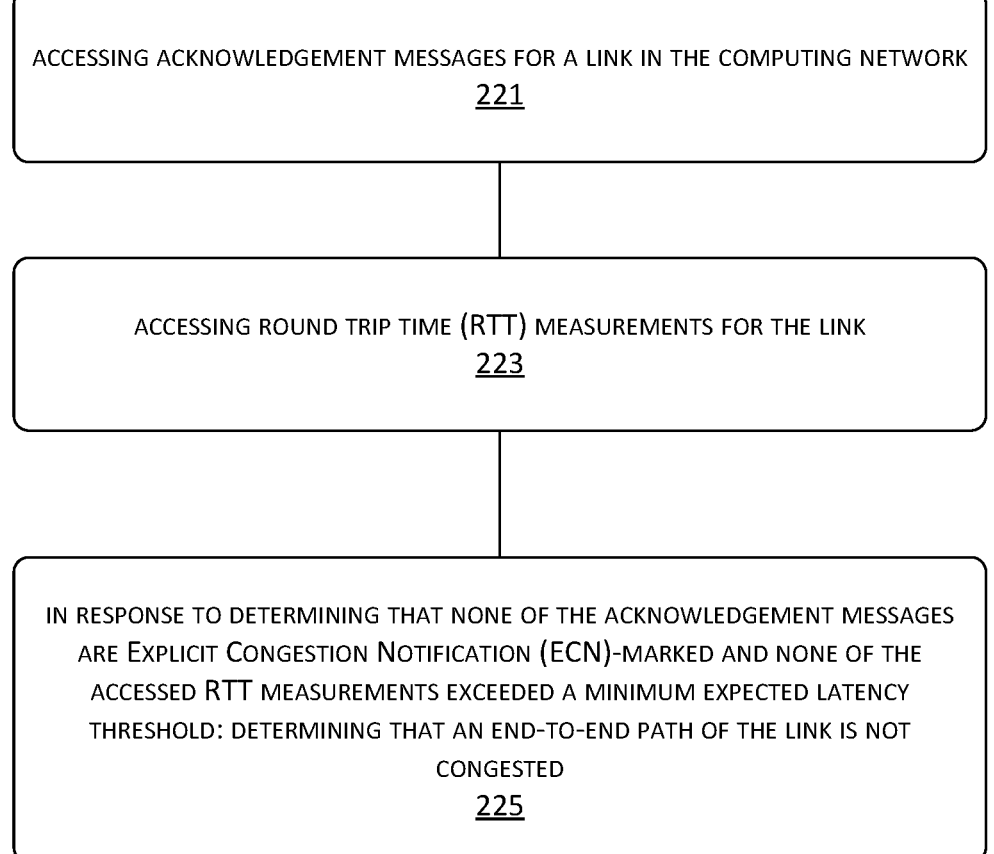

ACCESSING ACKNOWLEDGEMENT MESSAGES FOR A LINK IN THE COMPUTING NETWORK
221

ACCESSING ROUND TRIP TIME (RTT) MEASUREMENTS FOR THE LINK
223

IN RESPONSE TO DETERMINING THAT NONE OF THE ACKNOWLEDGEMENT MESSAGES ARE EXPLICIT CONGESTION NOTIFICATION (ECN)-MARKED AND NONE OF THE ACCESSED RTT MEASUREMENTS EXCEEDED A MINIMUM EXPECTED LATENCY THRESHOLD: DETERMINING THAT AN END-TO-END PATH OF THE LINK IS NOT CONGESTED
225

Figure 2D:
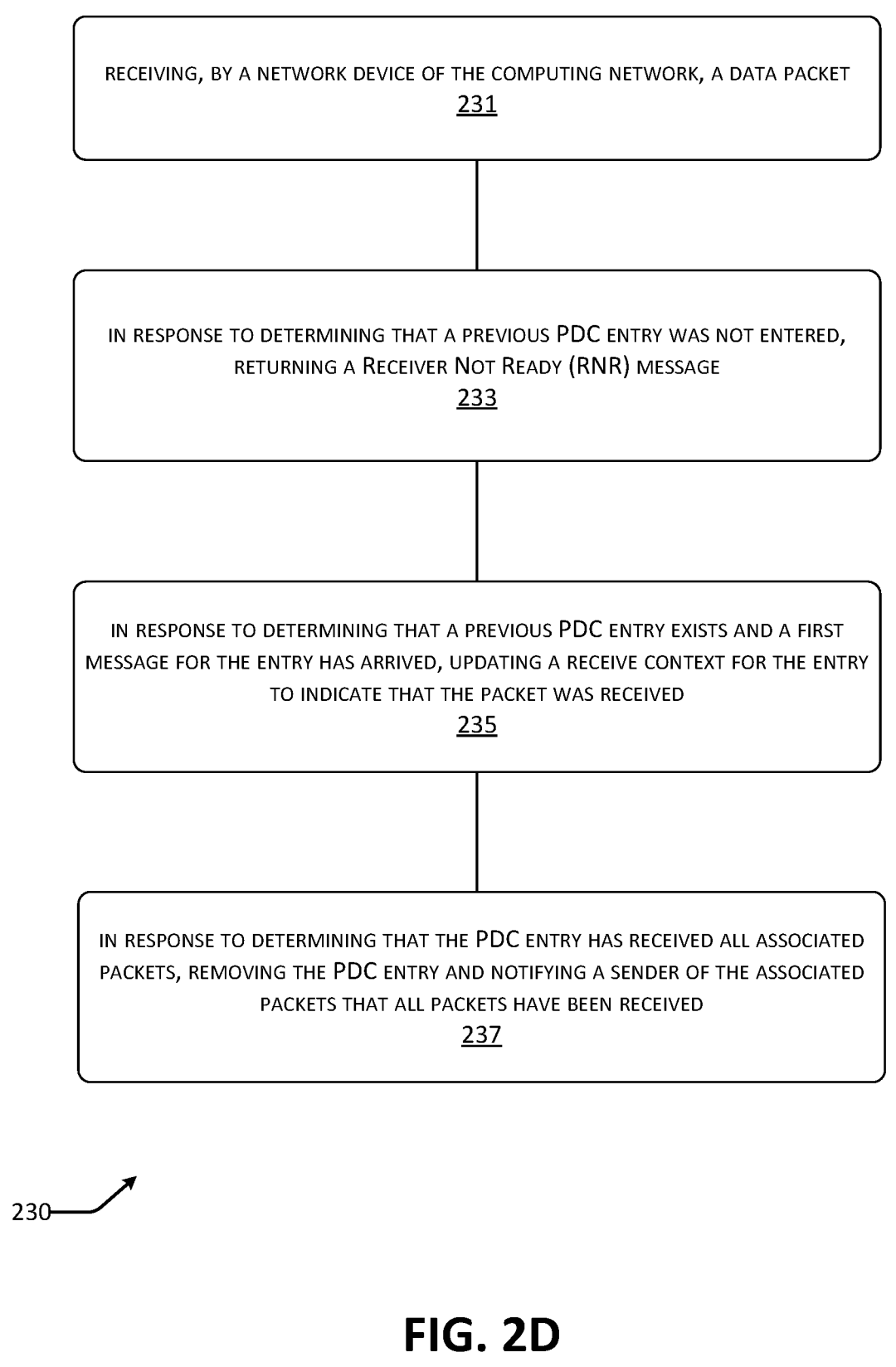

RECEIVING, BY A NETWORK DEVICE OF THE COMPUTING NETWORK, A DATA PACKET
231

IN RESPONSE TO DETERMINING THAT A PREVIOUS PDC ENTRY WAS NOT ENTERED, RETURNING A RECEIVER NOT READY (RNR) MESSAGE
233

IN RESPONSE TO DETERMINING THAT A PREVIOUS PDC ENTRY EXISTS AND A FIRST MESSAGE FOR THE ENTRY HAS ARRIVED, UPDATING A RECEIVE CONTEXT FOR THE ENTRY TO INDICATE THAT THE PACKET WAS RECEIVED
235

IN RESPONSE TO DETERMINING THAT THE PDC ENTRY HAS RECEIVED ALL ASSOCIATED PACKETS, REMOVING THE PDC ENTRY AND NOTIFYING A SENDER OF THE ASSOCIATED PACKETS THAT ALL PACKETS HAVE BEEN RECEIVED
237

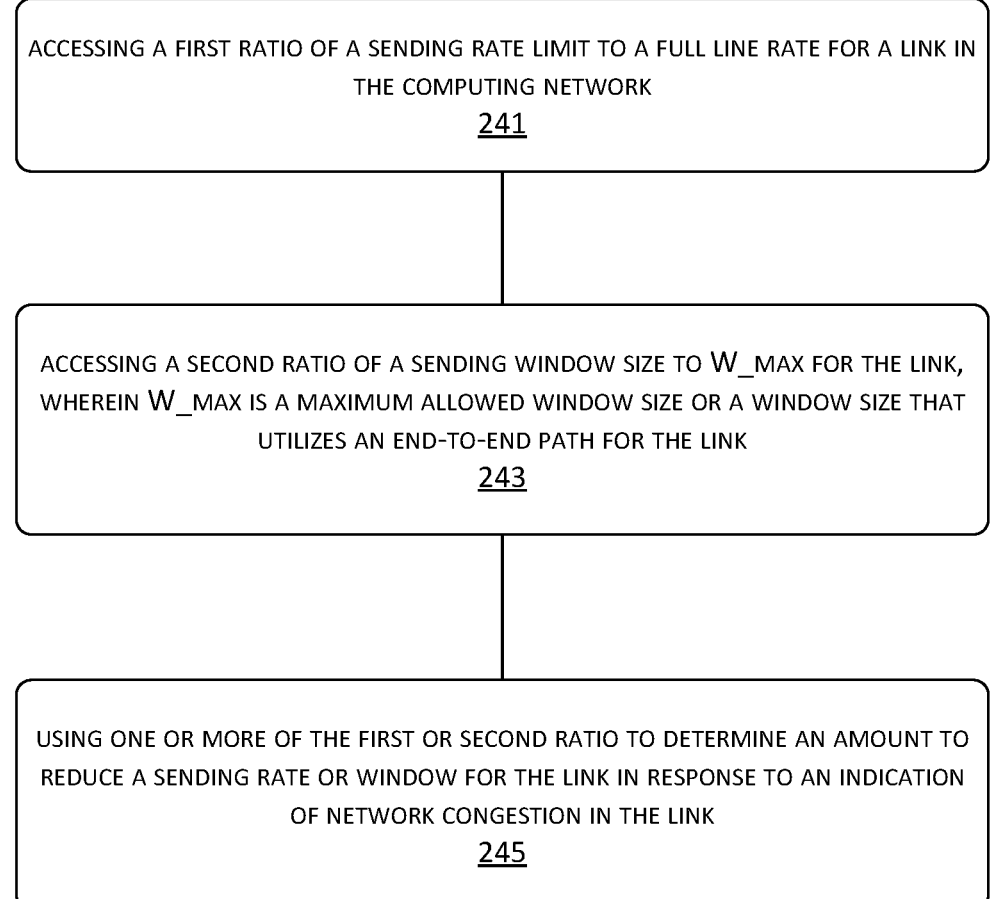

ACCESSING A FIRST RATIO OF A SENDING RATE LIMIT TO A FULL LINE RATE FOR A LINK IN THE COMPUTING NETWORK
241

ACCESSING A SECOND RATIO OF A SENDING WINDOW SIZE TO $W\_MAX$ FOR THE LINK, WHEREIN $W\_MAX$ IS A MAXIMUM ALLOWED WINDOW SIZE OR A WINDOW SIZE THAT UTILIZES AN END-TO-END PATH FOR THE LINK
243

USING ONE OR MORE OF THE FIRST OR SECOND RATIO TO DETERMINE AN AMOUNT TO REDUCE A SENDING RATE OR WINDOW FOR THE LINK IN RESPONSE TO AN INDICATION OF NETWORK CONGESTION IN THE LINK
245

GENERATING A CONNECTION-LEVEL MEASURE FOR CONGESTION IN THE COMPUTING NETWORK
251

ACCUMULATING THE CONNECTION-LEVEL MEASURE AT A PACKET LEVEL
253

LIMITING ACTIVATION OF THE CONGESTION CONTROL MECHANISM UNTIL THE ACCUMULATED CONNECTION-LEVEL MEASURE REACHES A THRESHOLD
255

250

Figure 2G:
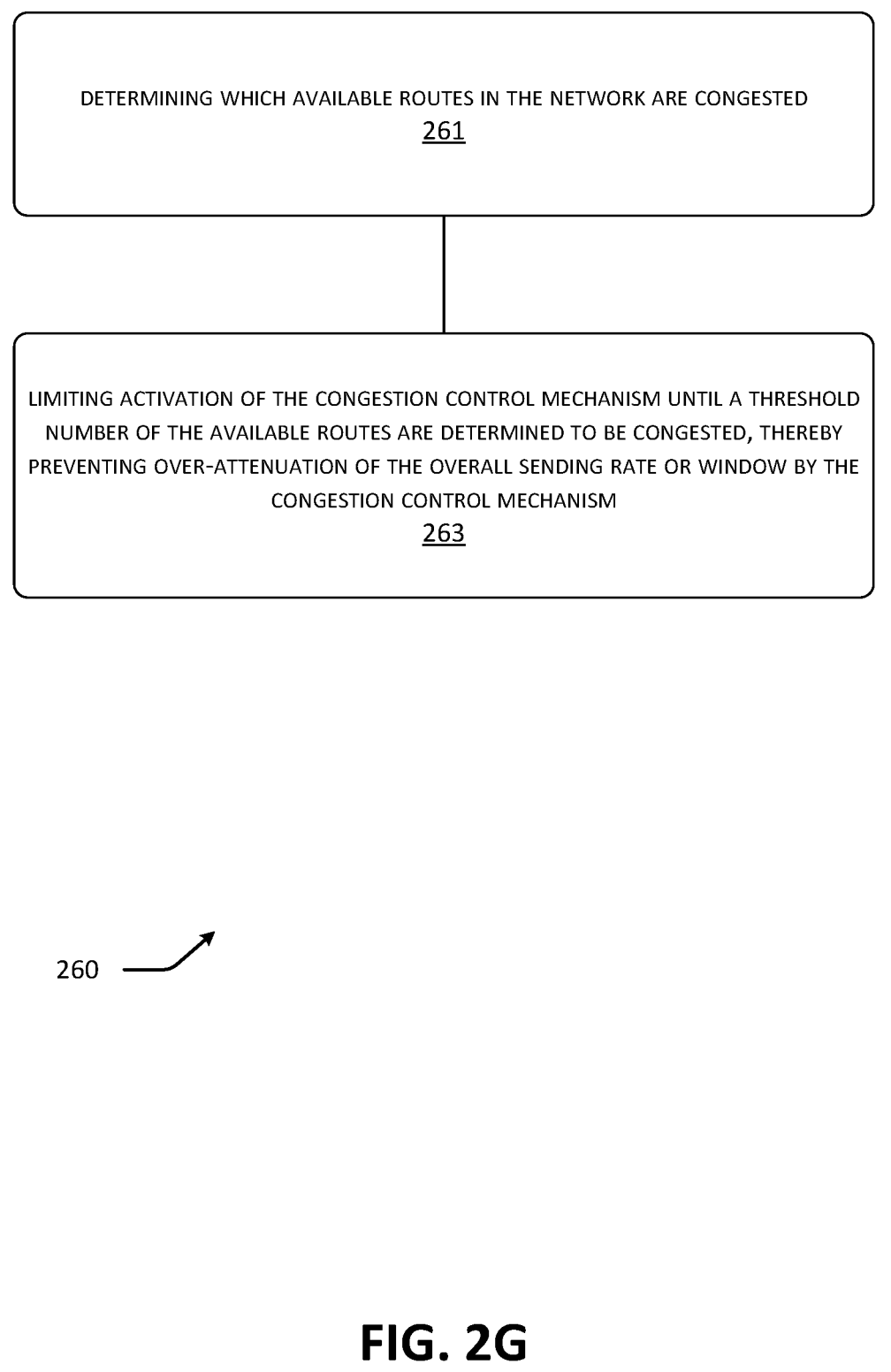

DETERMINING WHICH AVAILABLE ROUTES IN THE NETWORK ARE CONGESTED
261

LIMITING ACTIVATION OF THE CONGESTION CONTROL MECHANISM UNTIL A THRESHOLD NUMBER OF THE AVAILABLE ROUTES ARE DETERMINED TO BE CONGESTED, THEREBY PREVENTING OVER-ATTENUATION OF THE OVERALL SENDING RATE OR WINDOW BY THE CONGESTION CONTROL MECHANISM
263

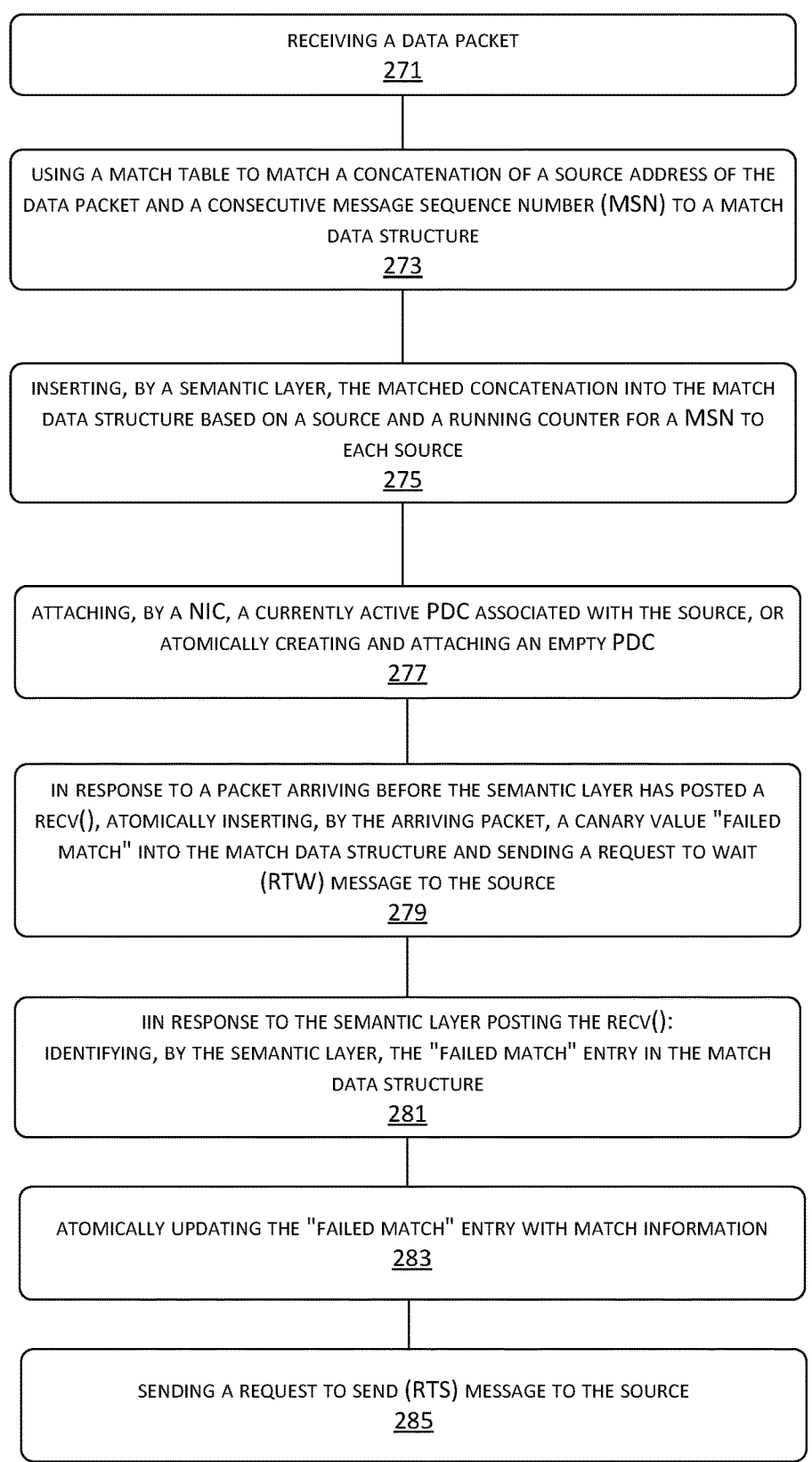

RECEIVING A DATA PACKET
271

USING A MATCH TABLE TO MATCH A CONCATENATION OF A SOURCE ADDRESS OF THE DATA PACKET AND A CONSECUTIVE MESSAGE SEQUENCE NUMBER (MSN) TO A MATCH DATA STRUCTURE
273

INSERTING, BY A SEMANTIC LAYER, THE MATCHED CONCATENATION INTO THE MATCH DATA STRUCTURE BASED ON A SOURCE AND A RUNNING COUNTER FOR A MSN TO EACH SOURCE
275

ATTACHING, BY A NIC, A CURRENTLY ACTIVE PDC ASSOCIATED WITH THE SOURCE, OR ATOMICALLY CREATING AND ATTACHING AN EMPTY PDC
277

IN RESPONSE TO A PACKET ARRIVING BEFORE THE SEMANTIC LAYER HAS POSTED A RECV(), ATOMICALLY INSERTING, BY THE ARRIVING PACKET, A CANARY VALUE "FAILED MATCH" INTO THE MATCH DATA STRUCTURE AND SENDING A REQUEST TO WAIT (RTW) MESSAGE TO THE SOURCE
279

IIN RESPONSE TO THE SEMANTIC LAYER POSTING THE RECV():
IDENTIFYING, BY THE SEMANTIC LAYER, THE "FAILED MATCH" ENTRY IN THE MATCH DATA STRUCTURE
281

ATOMICALLY UPDATING THE "FAILED MATCH" ENTRY WITH MATCH INFORMATION
283

SENDING A REQUEST TO SEND (RTS) MESSAGE TO THE SOURCE
285

Figure 4:
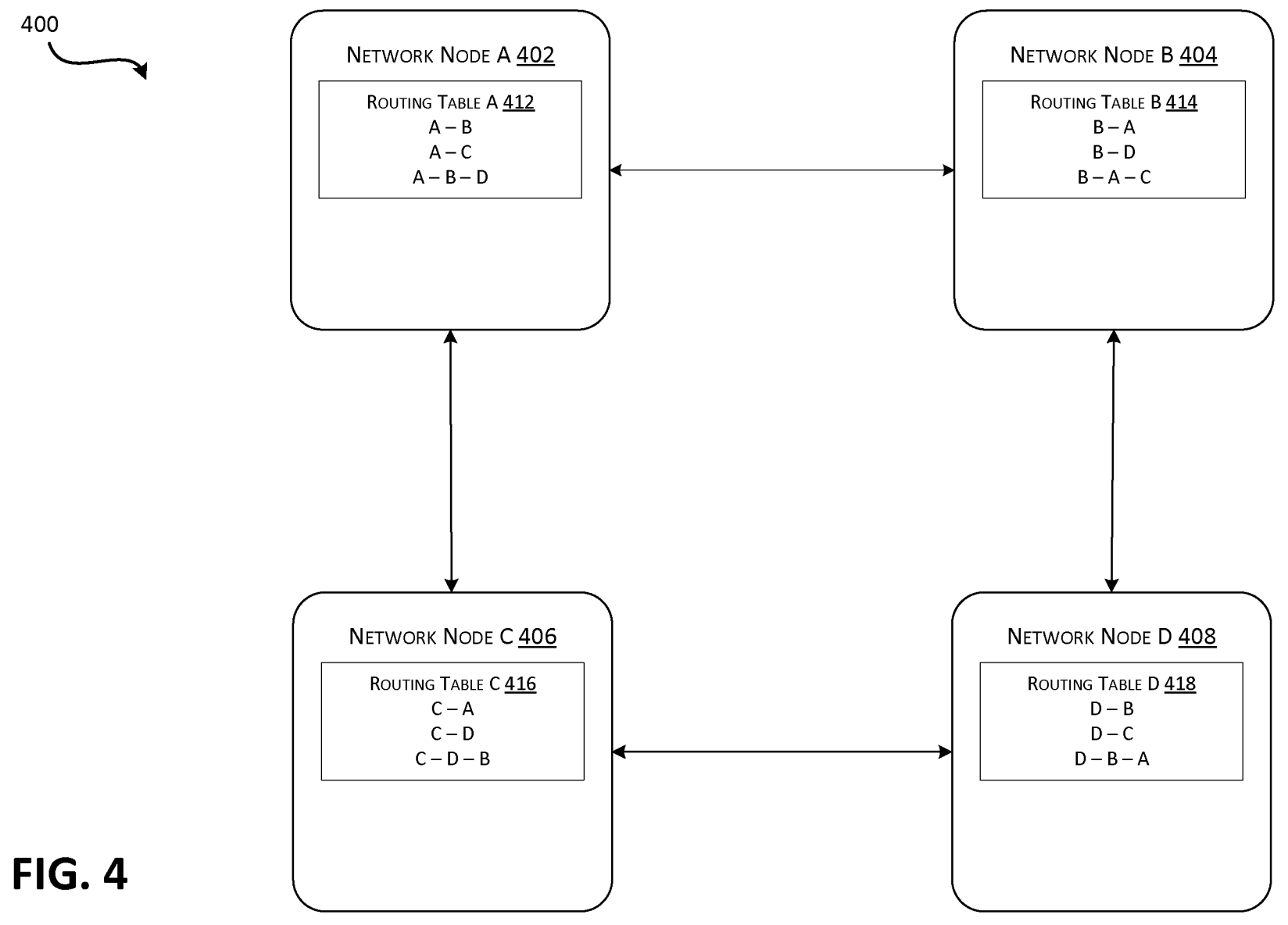

NETWORK NODE B 404

ROUTING TABLE B 414

B – A
B – D
B – A – C

NETWORK NODE D 408

ROUTING TABLE D 418

D – B
D – C
D – B – A

NETWORK NODE A 402

ROUTING TABLE A 412

A – B
A – C
A – B – D

NETWORK NODE C 406

ROUTING TABLE C 416

ROUND-TRIP TIME AND EXPLICIT CONGESTION NOTIFICATION SIGNALS FOR BANDWIDTH UTILIZATION

PRIORITY APPLICATIONS

This application claims priority to U.S. Provisional Application No. 63/530,991, entitled "WEIGHTED RANDOM EARLY BACK-TO-SENDER NOTIFICATION (WREB)", which was filed on Aug. 6, 2023, U.S. Provisional Application No. 63/530,992, entitled "RECYCLED ENTROPIES PACKET SPRAYING (REPS)", which was filed on Aug. 6, 2023, U.S. Provisional Application No. 63/530,997, entitled "LEVERAGING ROUND-TRIP TIME (RTT) AND EXPLICIT CONGESTION NOTIFICATION (ECN) SIGNALS FOR IMPROVING BANDWIDTH UTILIZATION", which was filed on Aug. 6, 2023, U.S. Provisional Application No. 63/531,000, entitled "LOW OVERHEAD SEND/RECEIVE DATA DELIVERY INTO USER MEMORY", which was filed on Aug. 6, 2023, U.S. Provisional Application No. 63/517,917, entitled "IMPROVING FAIRNESS AND CONGESTION CONTROL CONVERGENCE", which was filed on Aug. 6, 2023, U.S. Provisional Application No. 63/517,918, entitled "SCALABLE COORDINATION OF CONGESTION CONTROL AND ADAPTIVE LOAD BALANCING", which was filed on Aug. 6, 2023, and U.S. Provisional Application No. 63/517,919, entitled "EFFICIENTLY COORDINATING CONGESTION CONTROL AND ADAPTIVE LOAD BALANCING", which was filed on Aug. 6, 2023, all of which are incorporated herein by reference in their entirety.

BACKGROUND

As more data and services are stored and provided online via network connections, providing high performance and an optimal and reliable user experience is an important consideration for network providers and computer networking device manufacturers. In various examples, computer networking devices can include electronic devices that communicate and interact over a computer network via network packets such as gateways, routers, and switches. A network packet can be a formatted unit of data containing control information and user data. Such computer networking devices can implement software programs that process and execute network operations such as packet routing, rewriting, filtering and so forth.

Networking is becoming increasingly important for a number of use cases. For example, AI models such as Large Language Models (LLMs) are trained on clusters of thousands of GPUs, and network latency is critical for system performance. High-Performance Computing (HPC) is another use case that requires demanding network performance in terms of bandwidth and latency.

It is with respect to these and other considerations that disclosure made herein is presented.

SUMMARY

The techniques described herein enhance the performance of computer networks by implementing the methods described herein. The techniques of the present disclosure enable several technical benefits over existing approaches, in particular for enabling architectures that optimize network protocols such as Ethernet for high performance applications such as artificial intelligence AI and high-performance computing (HPC). Technical benefits include improved bandwidth, scale, and lower latency.

The disclosed embodiments include away to manage a computing network. A computing node is determined to be contributing to a network congestion event. A congestion notification message is generated, and a timing profile is determined for sending the congestion notification message based on the level of the network congestion event. Based on the timing profile, the congestion notification message is forwarded to the computing node that is contributing to the network congestion event.

The disclosed embodiments further include a way to manage a computing network implementing packet delivery contexts (PDCs). An entropy value is generated for a data packet to be transmitted on the computing network. The entropy value is usable to select or change a network path for the data packet. In response to receiving an acknowledgement message for the data packet, the entropy value is saved in a storage structure if the entropy value is acknowledged as not congested. When transmitting an additional data packet, an oldest saved entropy from the data structure is reused and the oldest saved entropy value is invalidated.

The disclosed embodiments further include a way to manage a computing network. Acknowledgement messages for a link in the computing network are accessed. Round trip time (RTT) measurements for the link are accessed. In response to determining that none of the acknowledgement messages are Explicit Congestion Notification (ECN)-marked and none of the accessed RTT measurements exceeded a minimum expected latency threshold, it is determined that an end-to-end path of the link is not congested.

The disclosed embodiments further include a way to manage a computing network implementing packet delivery contexts (PDCs). A network device of the computing network receives a data packet. In response to determining that a previous PDC entry was not entered, a Receiver Not Ready (RNR) message is returned. In response to determining that a previous PDC entry exists and a first message for the entry has arrived, a receive context for the entry is updated to indicate that the packet was received. In response to determining that the PDC entry has received all associated packets, the PDC entry is removed and a sender of the associated packets is notified that all packets have been received.

The disclosed embodiments further include a way to manage a computing network. A first ratio of a sending rate limit to a full line rate for a link in the computing network is accessed. A second ratio of a sending window size to W_max for the link is accessed. W_max is a maximum allowed window size or a window size that utilizes an end-to-end path for the link. One or more of the first or second ratio is used to determine an amount to reduce a sending rate or window for the link in response to an indication of network congestion in the link.

The disclosed embodiments further include a way to manage a computing network implementing a congestion control mechanism and a load balancing mechanism, where the load balancing mechanism is run at the packet level. A connection-level measure for congestion in the computing network is generated. The connection-level measure is accumulated at a packet level. Activation of the congestion control mechanism is limited until the accumulated connection-level measure reaches a threshold.

The disclosed embodiments further include a way to manage a computing network implementing a congestion control mechanism and a load balancing mechanism. It is determined which available routes in the network are congested. Activation of the congestion control mechanism is limited until a threshold number of the available routes are determined to be congested. This prevents over-attenuation of the overall sending rate or window by the congestion control mechanism.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

FIG. 2A through 2H are flowcharts depicting example procedures in accordance with the present disclosure;

FIG. 4 is a diagram illustrating an example architecture in accordance with the present disclosure;

FIG. 7 is an example computing system in accordance with the present disclosure.

DETAILED DESCRIPTION

Figure 1A:
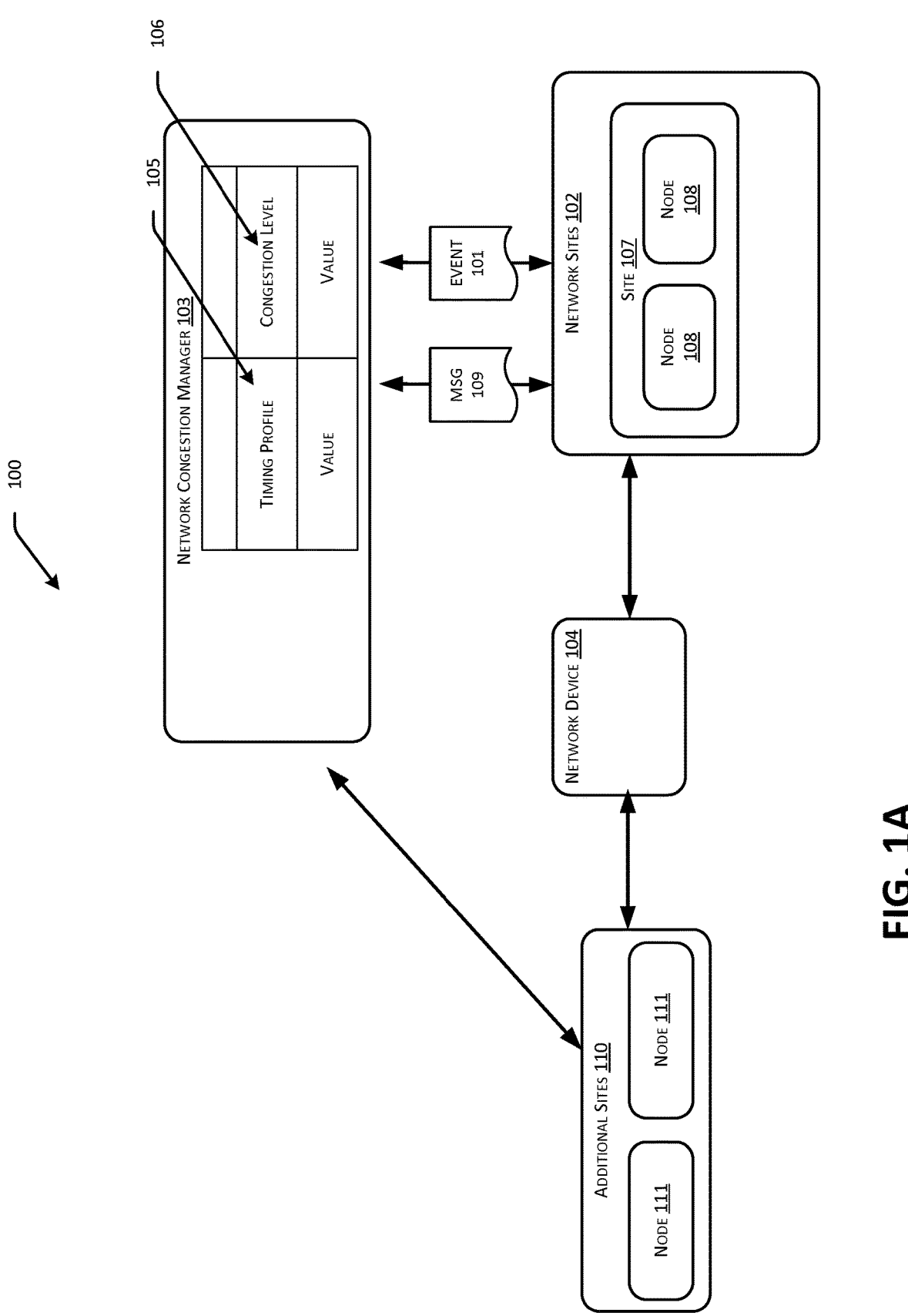
FIG. 1A through 1H and 1J through 1L are diagrams illustrating example architectures in accordance with the present disclosure.

The techniques discussed herein enhance the functionality of computer networking. Various examples, scenarios, and aspects that enable enhanced networking techniques are described below with respect to FIGS. 1-7.

Weighted Random Early Back-to-Sender Notification (WREB)

Typical congestion signaling in computing networks is implemented using end-to-end notifications, where a receiving node echoes or otherwise provides a notification regarding the existence of or the extent of network congestion. Some solutions propose an implementation whereby switches can participate in directly sending a notification to sending devices that are contributing to a congestion event (e.g., Back-to-Sender (BTS)) in order to reduce feedback latency and enable the sending devices to respond more promptly to congestion events. However, the additional signaling can result in additional bandwidth overhead as the additional signaling is not piggybacked on other control packets such as transport-level delivery acknowledgements (as is the case with traditional congestion signaling).

The present disclosure addresses this shortcoming by providing congestion feedback in a more efficient manner that minimizes the overhead of such BTS signals. In an embodiment, the frequency of BTS signaling is varied proportionally as a function of the congestion extent or level (e.g., queue length). For example, the frequency of BTS signaling is increased when the congestion level is higher or exceeds a threshold, thus allowing for more prompt responses at higher congestion levels and reducing overhead for BTS signaling when frequent BTS signaling is not warranted.

In one embodiment, the same Weighted Random profile is reused for generating Explicit Congestion Notification (ECN) marks (referred to as weighted random early detection (WRED) in data center Ethernet switches). A BTS packet is probabilistically generated based on the queue occupancy. In some embodiments, the BTS packet is probabilistically generated based on the queue occupancy in a linear fashion. In other embodiments, the BTS packet is probabilistically generated based on the queue occupancy in a varied or non-linear approach. In some embodiments, the disclosed technique is generalized to use other congestion measures or any combination of measures, such as the queue size, gradient, latency, and the like.

In a further embodiment, a mechanism is disclosed for responding to and handling duplicate BTS packets. Once a data packet has triggered a BTS message, its ECN bit is set. In one implementation, future queues will not trigger a BTS message if the ECN bit is set. An exception is if the data packet is later dropped, which in any case triggers a BTS. However, in this BTS packet, the ECN bit will be set, while in the earlier BTS packet, the ECN bit is not set, or vice versa (in the later BTS packet the ECN bit will be not set, while in the earlier BTS packet, the ECN bit is set). Thus, the sender can distinguish the case when a BTS has already triggered an early BTS (i.e., it is receiving a second BTS for the same message) by reading the ECN bit of the incoming BTS.

In some embodiments, one or more of the following signals can be added to BTS packets: (1) relative queue size, (2) number of active output flows, (3) total transmitted bytes on port and/or queue combination within a switch along with the timestamp for that snapshot, (4) cumulative buffer occupancy at the port and/or buffer level (which can be broken down by QoS queue groups), (5) queue size gradient (e.g., how fast the queue is increasing), and more generally other signals used in the in-band network telemetry (INT) context. These parameters can be used, in any combination, to probabilistically generate the BTS packet. Other parameters may be used in other embodiments.

The described framework can also be applied towards packets that are departing the queue. FIG. 1A illustrates various aspects of the disclosed embodiments. In a computing network 100, a network device 104 of the computing network 100 determines that a computing node 108 is contributing to a network congestion event 101. The network node can be part of a site 107 or network sites 102 in a data center, for example. Other nodes 111 of additional sites 110 may also be implemented. In response to the determination, a congestion notification message 109 is generated. A timing profile 105 for sending the congestion notification message is determined based on a level 106 of the network congestion event 101. In some embodiments, aspects of the disclosure can be implemented in a network congestion manager 103. Network congestion manager 103 can be implemented in a NIC, other network device, or a computing device. Based on the timing profile 105, the congestion notification message 109 is forwarded to the computing node 108 determined to be contributing to the network congestion event 101.

Turning now to FIG. 2A, illustrated is an example operational procedure for managing a computing network.

Such an operational procedure can be provided by one or more components illustrated in FIGS. 1-7. The operational procedure may be implemented in a system comprising one or more network devices or computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 200 is described as running on a system, it can be appreciated that the routine 200 and other operations described herein can be executed on an individual computing device or several devices.

Referring to FIG. 2A, operation 201 illustrates determining, by a network device of the computing network, that a computing node is contributing to a network congestion event.

Operation 203 illustrates in response to the determining, causing generation of a congestion notification message.

Operation 205 illustrates determining a timing profile for sending the congestion notification message based on a level of the network congestion event.

Operation 207 illustrates based on the timing profile, forwarding the congestion notification message to the computing node determined to be contributing to the network congestion event.

Recycled Entropies Packet Spraying (REPS)

The present disclosure describes techniques for saving entropies 'on the wire,' where it is not necessary to allocate memory for tracking all good entropies used throughout the life of a connection. In an embodiment, entropies that are known to be good and that have not been recycled are tracked.

As used herein, entropy refers to a value or signal that can be used to select or change a network path. For example, when using ECMP, the entropy is used to change the ECMP hash, which determines the route through the switch. A change of any value in the header will cause the ECMP hash function to select another random path. Entropy in this context is therefore any bit(s), value, or signals that corresponds to a network route and is usable to select or change a network path as indicated to a device on the network, where packets with the same entropy take the same path, and packets with different entropies may take different paths (and may also randomly hash to the same path again). The term entropy may also be referred to as a routing selector or routing value.

In an embodiment, initially (e.g., before any acknowledgements (ACKs) are received): a different entropy is generated for each transmitted packet. In an embodiment, the entropy can be generated randomly or using round-robin across a list or range of entropies. In an example, the new entropy value can be the next one in the list or deterministically changed or incremented.

In an embodiment, as ACKs are received: entropies that are acknowledged not to be congested (i.e., good entropies) are saved into a data structure such as a circular FIFO. It should be appreciated that other data structures can be implemented.

In response to transmitting additional data packets, a saved entropy is reused and invalidated (or otherwise prevented from being reused). If there are no valid entropies to reuse, a different entropy is used, using various methods described herein including the use of efficient mechanisms such as a counter. By implementing such a mechanism, it is possible to avoid reusing entropies that experienced congestion while recycling entropies that did not experience or otherwise run into congestion.

When there are no more transmissions for a connection, the good entropies observed per the last batch of ACKs will be buffered as described above. If the connection is flagged as "recurrent" (i.e., the good entropies will be relevant again for the same connection at a later time when the connection resumes transmission along the same set of the other recurrent connections), it would be beneficial to save these good entropies, for example offline. Otherwise, these buffered entropies will eventually expire.

The circular FIFO buffer need not be statically dedicated to each connection. The circular FIFO buffer can be dynamically allocated within a data structure shared across all or a subset of connections on a NIC. Thus, it is not necessary to optimize a per-connection circular FIFO buffer budget. A NIC can only receive some limited number of ACKs within an RTT (e.g., the maximum intra-datacenter RTT), and the size of the shared data structure can be a function of that maximum number.

Figure 1B:
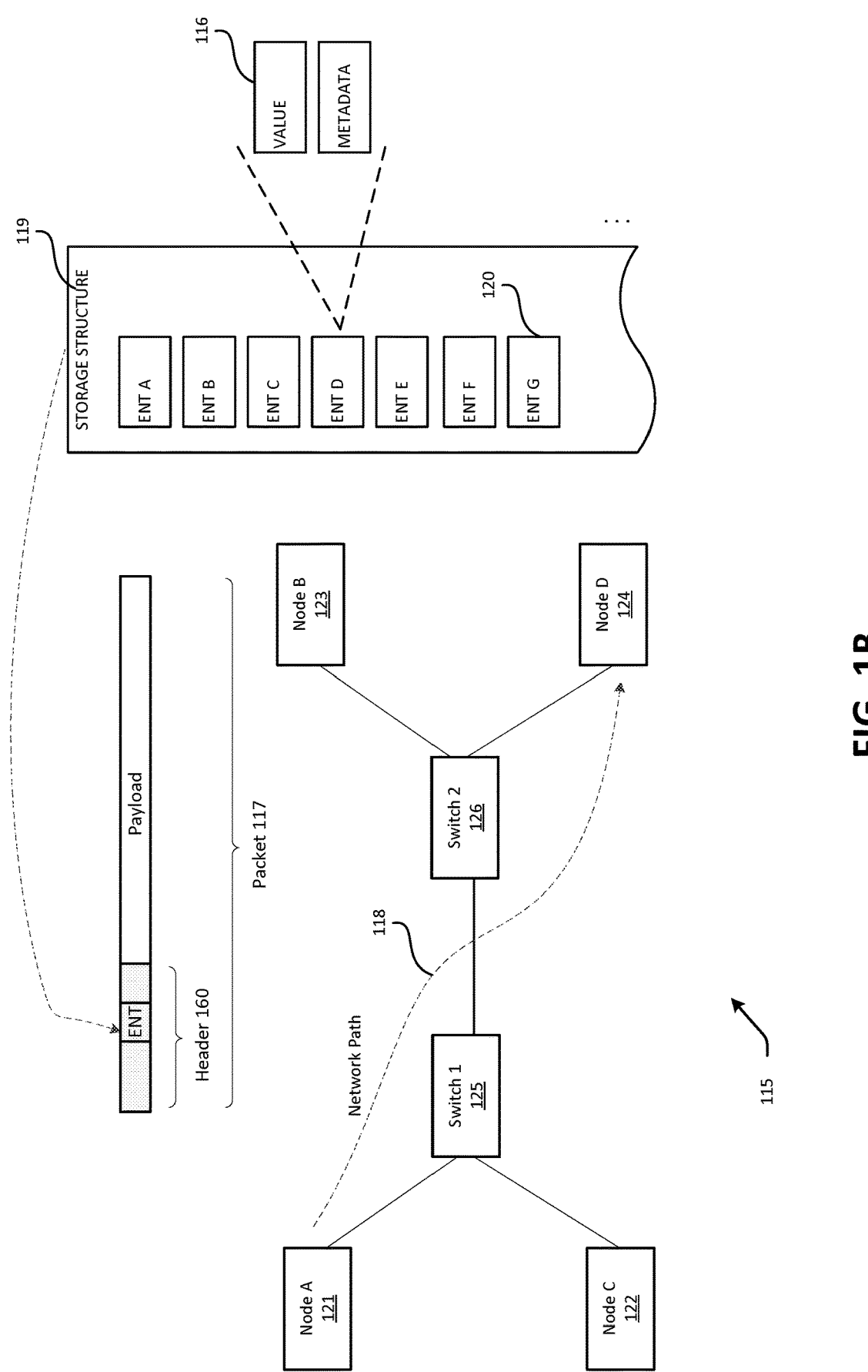

FIG. 1B illustrates various aspects of the disclosed embodiments. In a computing network 115 implementing packet delivery contexts (PDCs), an entropy value 116 is generated for a data packet 117 to be transmitted on the computing network 115. The entropy value 116 is usable to select or change a network path 118 for the data packet 117. The network path 118 may traverse a number of network devices or nodes which may include node A 121, node B 123, node C 122, and node D 124, and switch 1 125 and switch 2 126. In response to receiving an acknowledgement message for the data packet, the entropy value 116 is saved in a storage structure 119 if the entropy value 116 is acknowledged as not congested. When transmitting an additional data packet, an oldest saved entropy 120 is reused from the data structure 119 and the oldest saved entropy value 120 is invalidated.

Turning now to FIG. 2B, illustrated is an example operational procedure 210 for managing a computing network implementing packet delivery contexts (PDCs).

Such an operational procedure can be provided by one or more components illustrated in FIGS. 1-7. The operational procedure may be implemented in a system comprising one or more network devices or computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 210 is described as running on a system, it can be appreciated that the routine 210 and other operations described herein can be executed on an individual computing device or several devices.

Referring to FIG. 2B, operation 211 illustrates generating an entropy value for a data packet to be transmitted on the computing network, the entropy value usable to select or change a network path for the data packet.

Operation 213 illustrates in response to receiving an acknowledgement message for the data packet, saving the entropy value in a storage structure if the entropy value is acknowledged as not congested.

Operation 215 illustrates when transmitting an additional data packet, reusing an oldest saved entropy from the data structure and invalidating the oldest saved entropy value.
Leveraging Round-Trip Time (RTT) and Explicit Congestion Notification (ECN) Signals for Improving Bandwidth Utilization RTT and ECN signals are commonly used in congestion control mechanisms for data center networks. RTTs are typically measured and reported for each data packet. Hence, it is possible to determine whether any particular packet has experienced congestion. One drawback of using RTT as a signal is that it is not indicative of the most recent congestion status on the network devices that are traversed at the time that the corresponding packet departed those network devices. For example, a particular packet may not have encountered congestion despite a congestion event occurring after the packet has traversed the network (e.g., a massive queue build-up behind the packet at the time the packet was serviced on a switch). The ECN signal is usually applied probabilistically to packets departing a congested switch, which means that some packets might not receive the ECN signal despite the packet having traversed a congested switch.

Unlike the RTT signal, ECN marking does reflect the current congestion status of a switch upon a packet's departure, regardless of whether the packet itself encountered congestion.

In various embodiments, both the RTT signal and ECN signal are used to determine whether it is safe for a connection to increase its rate or window to better utilize its end-to-end path. In one embodiment, all acknowledgements are observed at the connection level within a window epoch (for window-based congestion control mechanisms) or a time period (for rate-based congestion control mechanisms). In an embodiment, it is determined whether: (1) none of the acknowledgements (ACKs) were ECN-marked and (2) none of the reported RTT measurements exceeded an expected latency threshold. This threshold can be programmable as a function of the topology, MTU size, link speeds, and other parameters. If both (1) and (2) are true, then it can be determined that the overall end-to-end path of the corresponding connection is not congested and is more likely to be underutilized, which would safely warrant an aggressive bandwidth recovery operation (e.g., TCP slow-start).

Figure 1C:
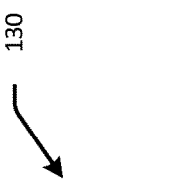
Figure 1C:
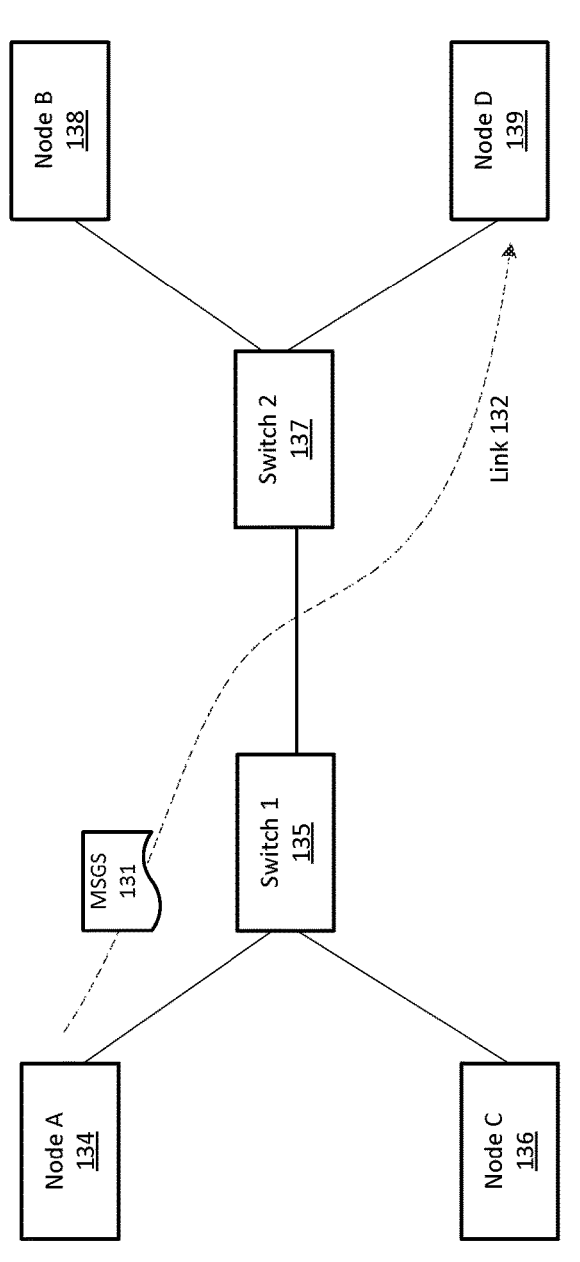
Figure 1C:
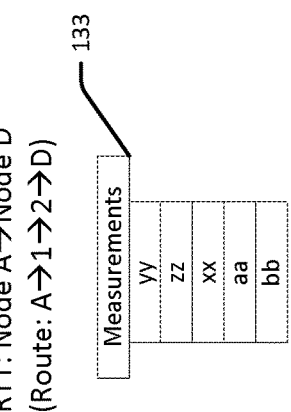

FIG. 1C illustrates various aspects of the disclosed embodiments. In a computing network 130, acknowledgement messages 131 are accessed for a link 132 in the computing network 130. Round trip time (RTT) measurements 133 are accessed for the link 132. Link 132 may traverse a number of network devices or nodes which may include node A 134, node B 138, node C 136, and node D 139, and switch 1 135 and switch 2 137. In response to determining that none of the acknowledgement messages 131 are Explicit Congestion Notification (ECN)-marked and none of the accessed RTT measurements 133 exceeded a minimum expected latency threshold, it is determined that an end-to-end path of the link 132 is not congested.

Turning now to FIG. 2C, illustrated is an example operational procedure 220 for managing a computing network.

Such an operational procedure can be provided by one or more components illustrated in FIGS. 1-7. The operational procedure may be implemented in a system comprising one or more network devices or computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 220 is described as running on a system, it can be appreciated that the routine 220 and other operations described herein can be executed on an individual computing device or several devices.

Referring to FIG. 2C, operation 221 illustrates accessing acknowledgement messages for a link in the computing network.

Operation 223 illustrates accessing round trip time (RTT) measurements for the link.

Operation 225 illustrates in response to determining that none of the acknowledgement messages are Explicit Congestion Notification (ECN)-marked and none of the accessed RTT measurements exceeded a minimum expected latency threshold: determining that an end-to-end path of the link is not congested.

Low Overhead Send/Receive Data Delivery into User Memory

Most distributed AI workloads today run over some type of NCCL-like interface (referred to as *CCL herein). Those *CCL libraries offer several communication routines that fall into two categories: message passing (MP) and collectives.

Examples of message passing (MP, sometimes referred to as "point to point") API calls and Collective signatures can include various Message Passing Interface (MPI) calls.

In an embodiment, an architecture is defined that enables implementation of AI MP semantics without additional overhead (with a single packet matching/TCAM engine step) in a connection-less setting. This architecture provides most of the benefits of RMA semantics (and RDMA implementations) to MP semantics. Specifically, the architecture only requires a single match for each packet to deliver the data into user memory.

UEC Network Interface Cards (NICs) do not use connections but Packet Delivery Contexts (PDCs) that potentially only exist for a single message transmission. However, a NIC needs to match incoming packets to PDCs for reliability—and the NIC needs a PDC for any message transmission. The same matching mechanism can be used to not only match a packet to a PDC but also to a message. This can be viewed as merging (breaking) the layering between the semantics and packet delivery sub-layers. In an embodiment, a match table dictionary is considered (MTD, often implemented as TCAM or hash function) that matches the concatenation of source address and a consecutive message sequence number (MSN) to a match data structure. A match then contains a pointer to the corresponding active PDC or an empty PDC canary value. Multiple different matches can point to the same PDC as the PDC is global between a source-destination pair and handles all packet transmissions (for packets of multiple, potentially simultaneously arriving, messages).

A match is installed by the semantic layer (atomically) based on src ("peer") and a running counter for the MSN specific to each source. The MSN allows packets from different messages that arrive out of order to be matched to the correct recv( ) calls (in the correct order). Each match carries the target buffer specified at the receiver (*CCL MP semantics). Each packet carries either its offset into the target buffer or a packet number of the message such that the offset can be computed. Thus, arriving packets can be committed to memory independently of their order of arrival. The receiver maintains a bitmap (which can be associated with the match) to determine when a message is completed. The PDC layer at the source handles timeouts and retransmissions, as usual. When a match is inserted by the semantic layer, the NIC either attaches the currently active PDC related to the source or creates and attaches an empty PDC atomically. This can be performed by inserting a dummy SYN packet into the packet pipeline logic. This way, match entries always have a valid PDC attached.

If a packet arrives before the semantic layer has posted the recv( ), it will fail to match (the incoming packet may have created a new PDC or may have reused an existing one). Based on the arriving packet, a special canary value "failed match" is atomically inserted into the match table and sends a "request to wait" (RTW) message to the source. Upon reception of an RTW, the source will stop sending. Each incoming packet that matches a "failed match" (or non-existing) entry in the match table will trigger such an RTW message. Thus, RTW does not need to be retransmitted. Once the semantic layer posts the recv( ), the semantic layer will find the "failed match" entry in the match table. The semantic layer then atomically updates the "failed match" entry to the correct match information and sends a "request to send" (RTS) message to the source. (Note that RTS can be referred to as other message names such as "request to resume" (RTR)). The source re-starts the message transmission from the first packet upon the reception of an RTS message. The source may stop all messages to the target process upon reception of RTW or only the message in question. RTS messages are retransmitted by the PDC layer if the PDC does not receive a data message from the source in a given time (this does not need a packet sequence number (PSN) as there is only one RTS active at any time on a src-dest PDC). The incoming message triggered by an RTS will now be guaranteed to match. This RTW protocol will retransmit/waste one BDP of data, which is optimal if send is always performed at full speed, and it is assumed that buffering is not performed at the destination. Similarly, the sender could send a data stream of its current window size and then the receiver can fetch the remaining data from the source once the receive is posted (either before or after the initial message arrived). In an embodiment, more generally a BDP of data (e.g., a message of size BDP) can be sent and then the remaining data can be retrieved with another mechanism, for example using a rendezvous protocol or more generally a communication protocol that enables coordination or synchronization of communications.

The described *CCL-style matching mechanism can be implemented in hardware. In an embodiment, the sender has a state machine for each send (message) that starts in the state "sending" when the semantic layer submits a send, and the state transitions to "done" when all ACKs are received. The state transitions to "waiting" when an RTW is received and back to "sending" when an RTS is received. While in "sending", each packet is transmitted by the PDC using its own (standard) state machine with CC/LB and retransmission logic. The state transitions to "complete" when all ACKs are received. The receiver's state machine is similar and captured in the state of the MTD for each recv. A recv state becomes "posted" when its corresponding match is added to the MTD and during packet reception. The state can be "nonexistent" if a message arrives before it was posted and can be "complete" when all data was received.

Figure 1D:
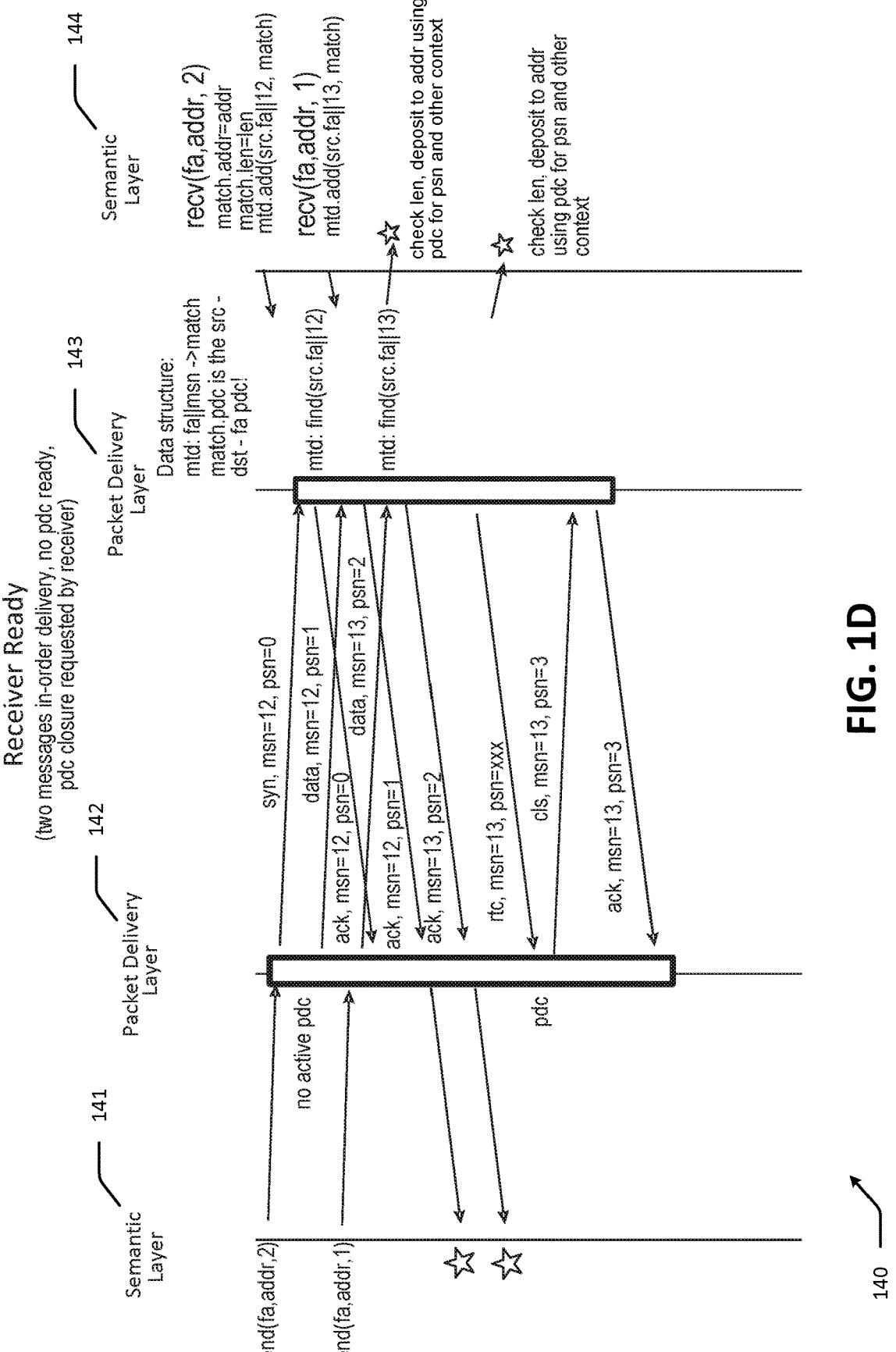
Figure 1E:
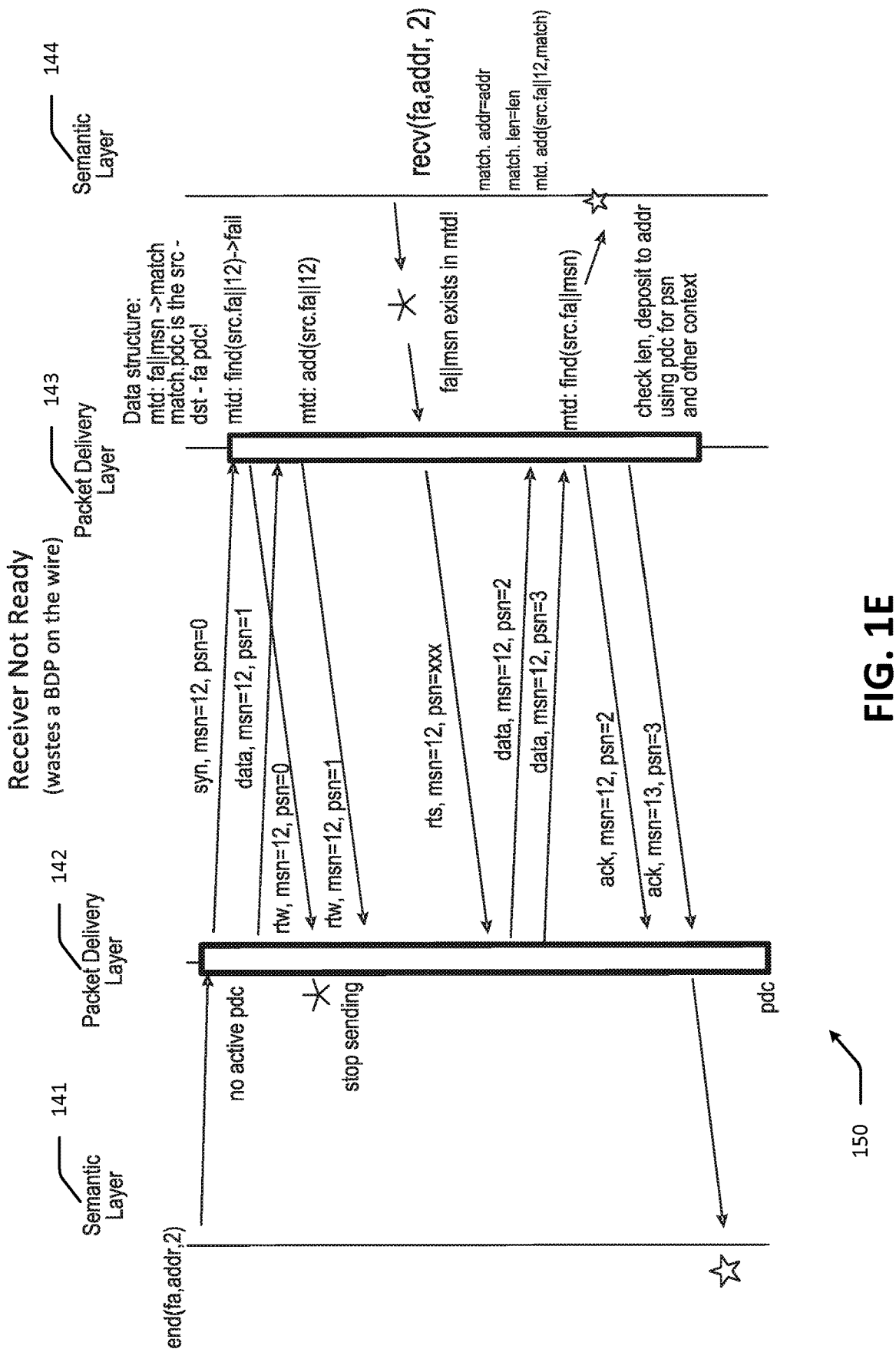
Figure 1F:
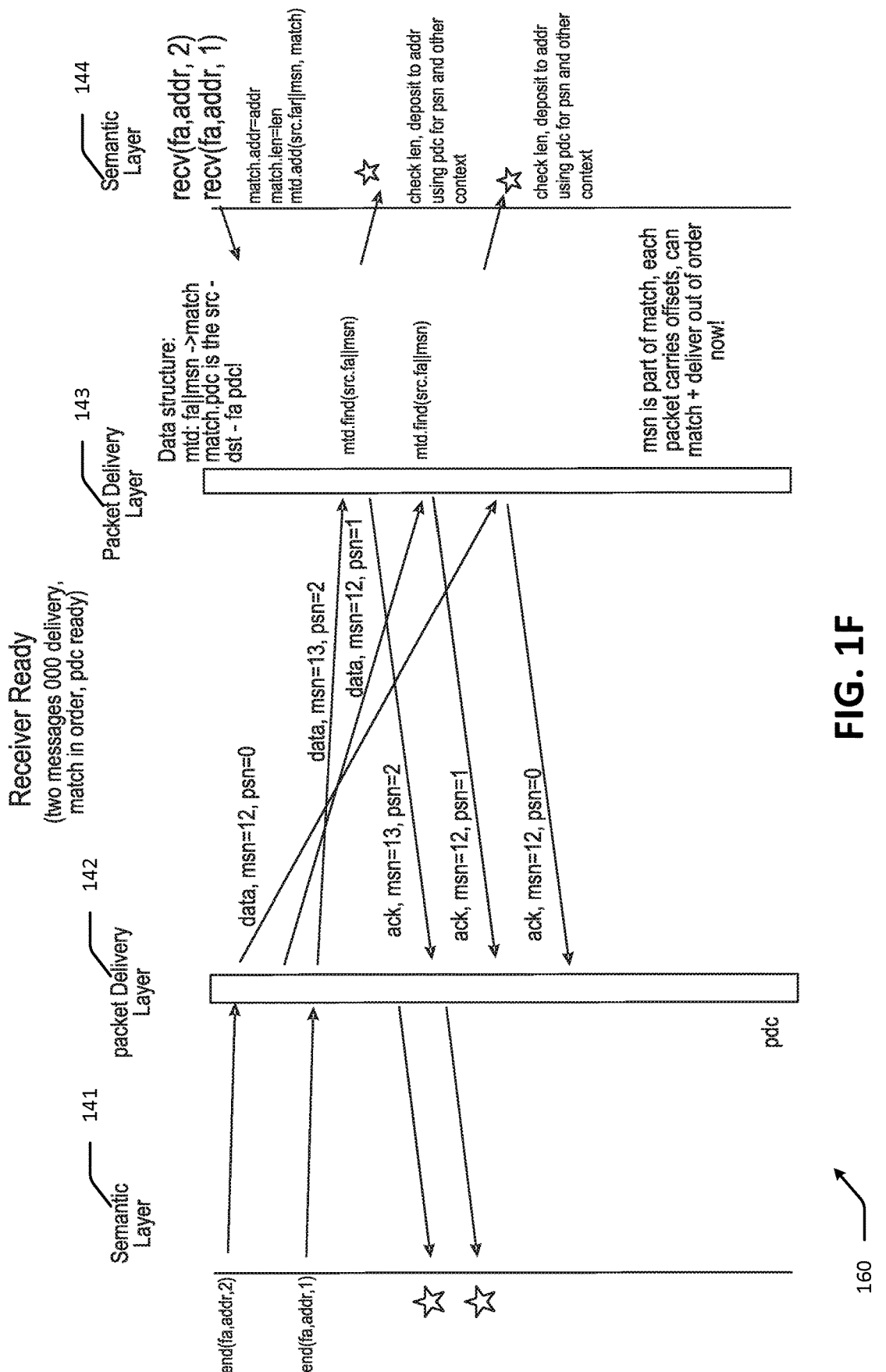

FIGS. 1D-1F illustrate various examples of the above described protocols in the UEC context. FIG. 1D illustrates an example where the receiver is ready and the recv has already been posted when the send packet arrives. FIG. 1D illustrates a flow diagram 140 with semantic layer 141, packet delivery layer 142, packet delivery layer 143, and semantic layer 144. In FIGS. 1D through 1F, "fa" refers to fabric address which is a node address such as an IP address. Thus, in send(fa,addr,2) references a fabric address, addr references a local address, and "2" references the expected number of bytes or packets or other measure. Additionally, "msn" refers to message sequence number, and "psn" refers to packet sequence number.

FIG. 1E illustrates a flow diagram 150 with semantic layer 141, packet delivery layer 142, packet delivery layer 143, and semantic layer 144. FIG. 1E illustrates an example of receiver not ready which essentially wastes a BDP on the wire. When the receiver does not find an entry, the receiver sends a request to wait and registers the entry. At a later time, when the entry is found for the packet, a request to send/request to start/request to restart/request to resume is sent.

FIG. 1F illustrates a flow diagram 160 with semantic layer 141, packet delivery layer 142, packet delivery layer 143, and semantic layer 144. FIG. 1F illustrates an example of receiver ready with two messages with out-of-order delivery, match in order, and PDC ready.

Figure 1G:
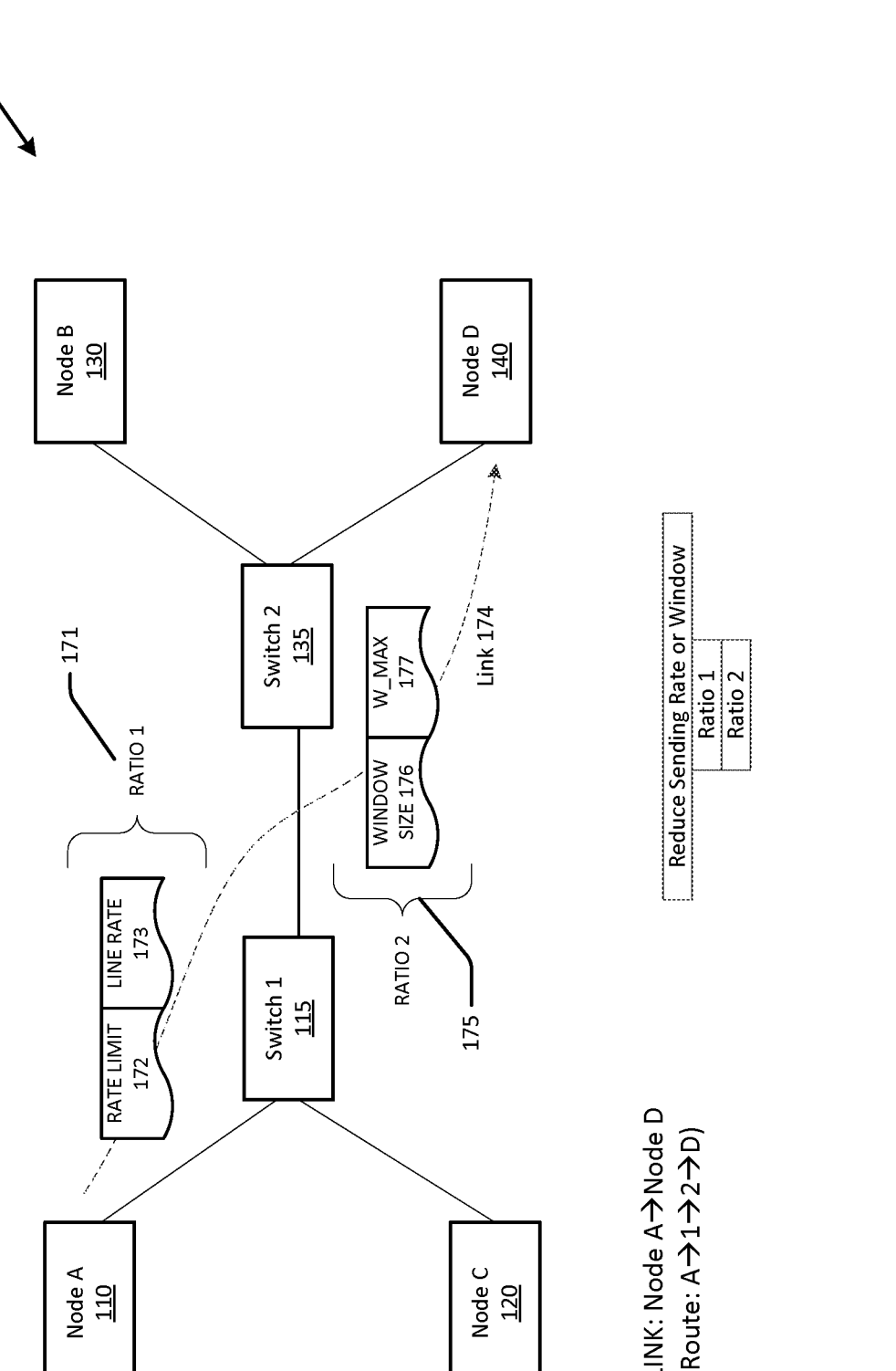
Figure 1H:
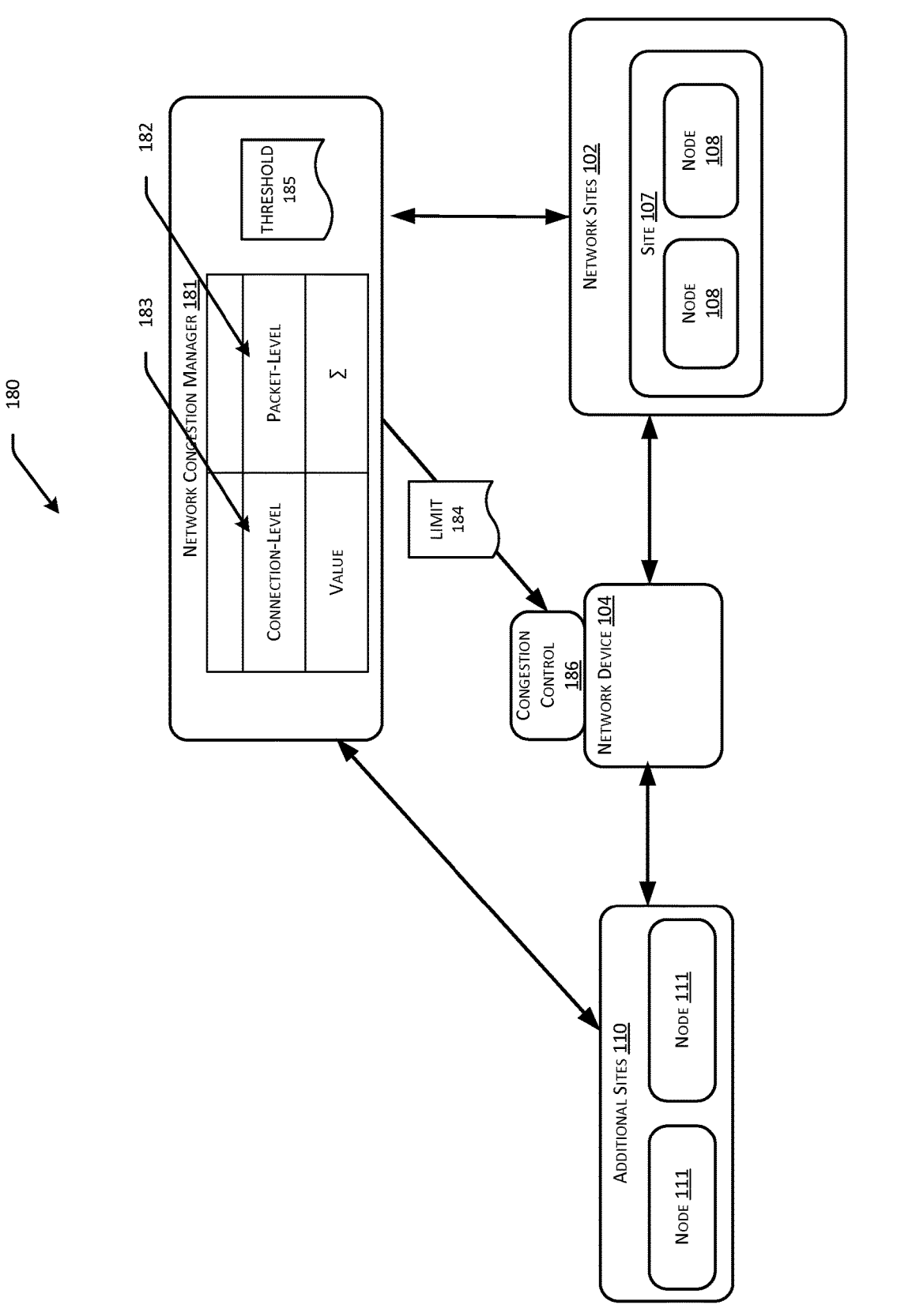
Figure 1J:
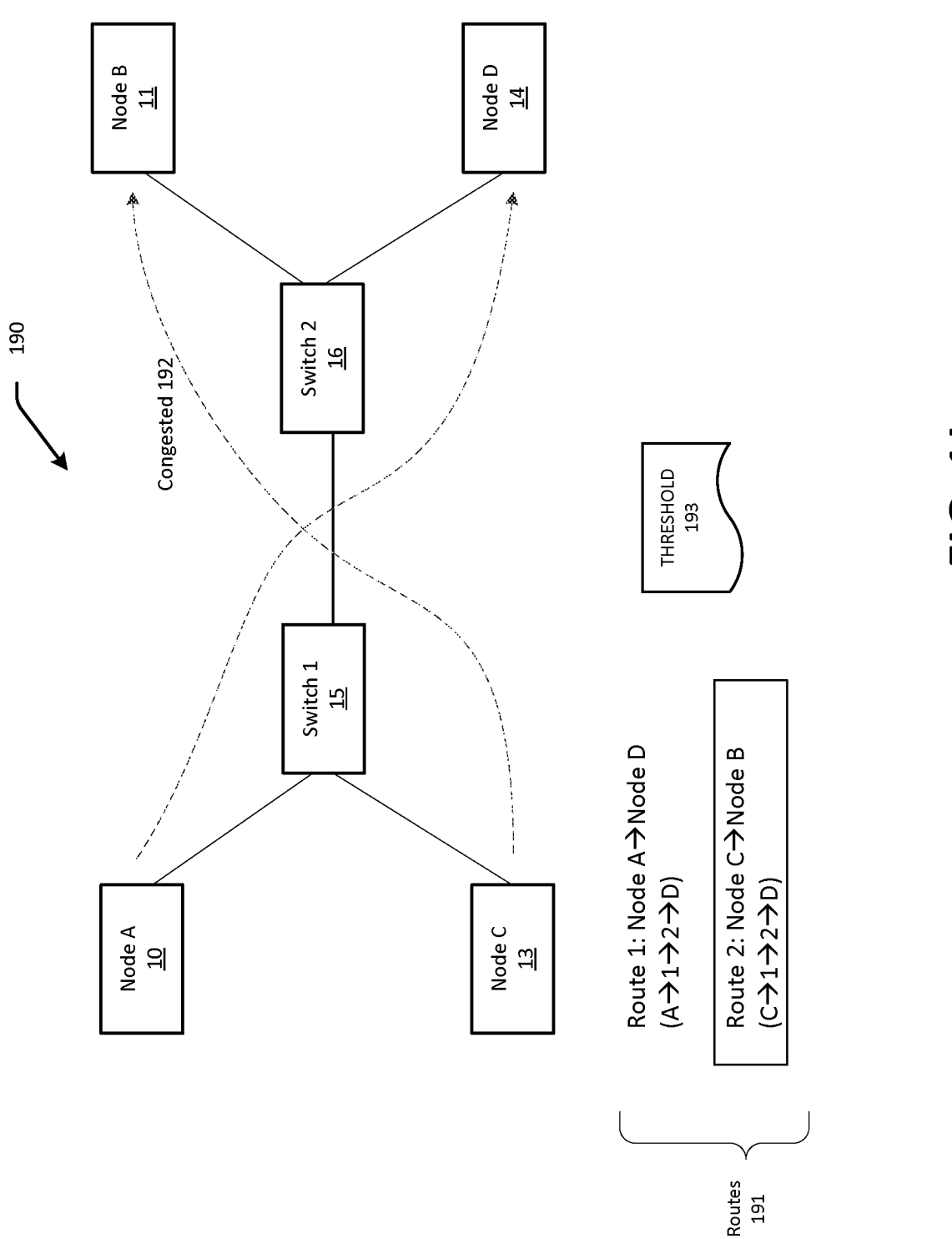
Figure 1K:
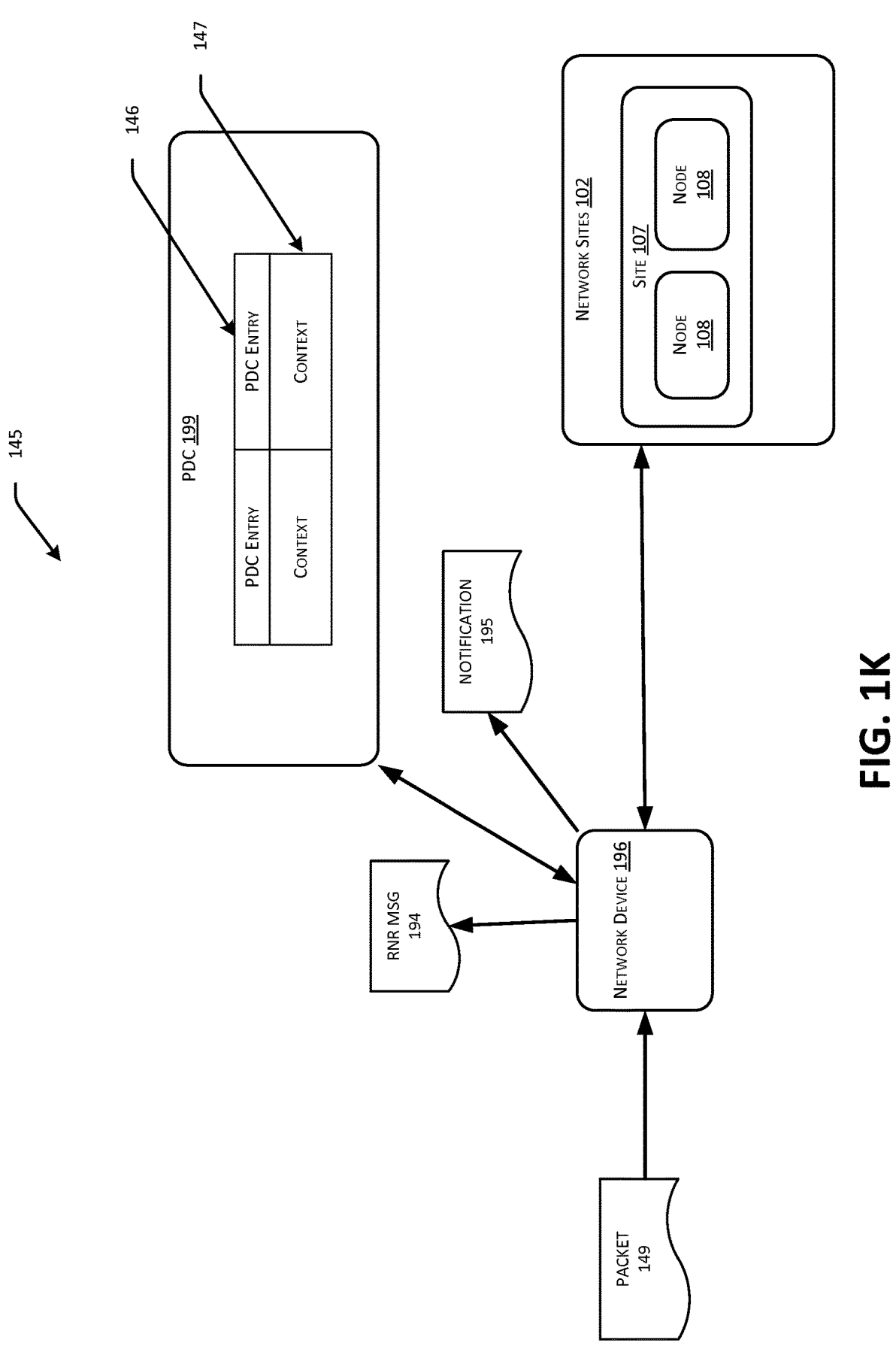

FIG. 1K illustrates various aspects of the disclosed embodiments. In a computing network 145 implementing packet delivery contexts (PDCs), network device 196 receives a data packet 149. In response to determining that a previous PDC entry 146 was not entered, a Receiver Not Ready (RNR) message 194 is returned. In response to determining that a previous PDC entry 146 exists and a first message for the entry has arrived, a receive context 147 is updated for the entry to indicate that the packet was received. In response to determining that the PDC entry 146 has received all associated packets, the PDC entry is removed and a sender of the associated packets is notified 195 that all packets have been received.

Figure 1L:
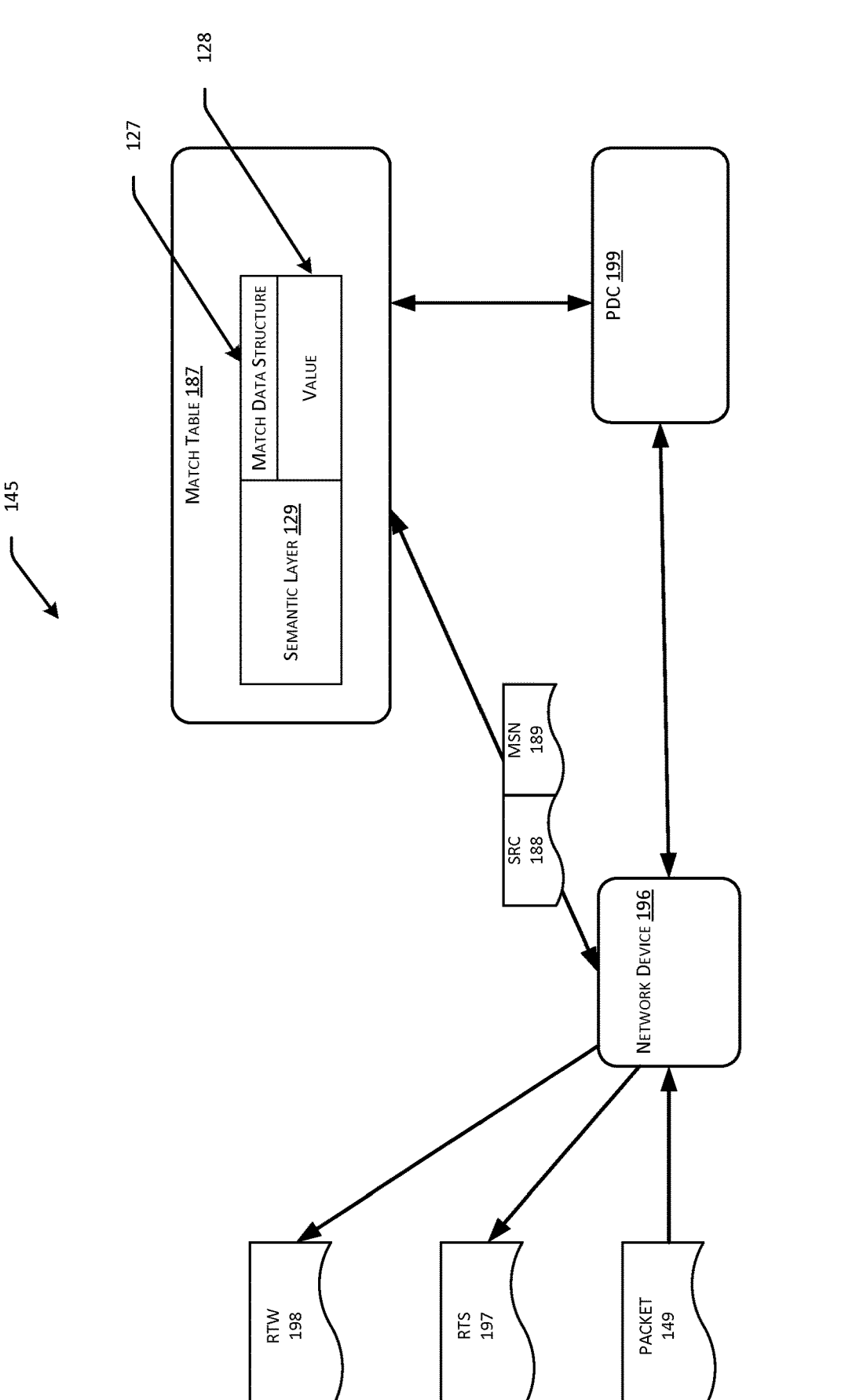

FIG. 1L illustrates various aspects of the disclosed embodiments. In a computing network 145 implementing packet delivery contexts (PDCs), a data packet 149 is received. Using a match table 187 to match a concatenation of a source address 188 of the data packet and a consecutive message sequence number (MSN) 189 to a match data structure 127, semantic layer 129 inserts the matched concatenation into the match data structure 127 based on a source and a running counter for a MSN to each source. Network device 196 (which can be a NIC in some implementations) attaches a currently active PDC 199 associated with the source or atomically creates and attaches an empty PDC. In response to a packet arriving before the semantic layer 129 has posted a recv( ), a canary value 128 "failed match" is atomically inserted into the match data structure 127 and a request to wait (RTW) message 198 is sent to the source. In response to the semantic layer posting 129 the recv( ), the semantic layer 129 identifies the "failed match" entry in the match data structure 127. The "failed match" entry is atomically updated with correct match information, and a request to send (RTS) message 197 is sent to the source.

Turning now to FIG. 2D, illustrated is an example operational procedure 230 for managing a computing network.

Such an operational procedure can be provided by one or more components illustrated in FIGS. 1-7. The operational procedure may be implemented in a system comprising one or more network devices or computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 230 is described as running on a system, it can be appreciated that the routine 230 and other operations described herein can be executed on an individual computing device or several devices.

Referring to FIG. 2D, operation 231 illustrates receiving, by a network device of the computing network, a data packet.

Operation 233 illustrates in response to determining that a previous PDC entry was not entered, returning a Receiver Not Ready (RNR) message.

Operation 235 illustrates in response to determining that a previous PDC entry exists and a first message for the entry has arrived, updating a receive context for the entry to indicate that the packet was received.

Operation 237 illustrates in response to determining that the PDC entry has received all associated packets, removing the PDC entry and notifying a sender of the associated packets that all packets have been received.

Turning now to FIG. 2H, illustrated is an example operational procedure 270 for managing a computing network implementing packet delivery contexts (PDCs).

Such an operational procedure can be provided by one or more components illustrated in FIGS. 1-7. The operational procedure may be implemented in a system comprising one or more network devices or computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 270 is described as running on a system, it can be appreciated that the routine 270 and other operations described herein can be executed on an individual computing device or several devices.

Referring to FIG. 2H, operation 271 illustrates receiving a data packet.

Operation 273 illustrates using a match table to match a concatenation of a source address of the data packet and a consecutive message sequence number (MSN) to a match data structure.

Operation 275 illustrates inserting, by a semantic layer, the matched concatenation into the match data structure based on a source and a running counter for a MSN to each source.

Operation 277 illustrates attaching, by a NIC, a currently active PDC associated with the source, or atomically creating and attaching an empty PDC.

Operation 279 illustrates in response to a packet arriving before the semantic layer has posted a recv( ), atomically inserting, by the arriving packet, a canary value "failed match" into the match data structure and sending a request to wait (RTW) message to the source.

Operation 281 illustrates in response to the semantic layer posting the recv( ):

identifying, by the semantic layer, the "failed match" entry in the match data structure.

Operation 283 illustrates atomically updating the "failed match" entry with match information.

Operation 285 illustrates sending a request to send (RTS) message to the source.

Improving Fairness and Congestion Control Convergence

Many congestion control schemes address ongoing congestion by iteratively reducing the sending rate or window (e.g., the number of packets allowed to be sent within a time window) as a function of the congestion measure (as signaled by network devices or inferred from end-to-end round-trip time measurements, for example) or the frequency of these measurements (applicable in the case of ECN, for example). Typically, the amount of reduction is a constant value.

In an embodiment, the following ratios are included in the determination of the rate or window reduction:

1. Ratio of the sending rate limit to the full line rate (i.e., network interface card (NIC) speed) for rate-based mechanisms (or a function that combines the current rate limit and the full line rate).

2. Ratio of the sending window size to W_max, where W_max is the maximum allowed window size or a window size that is large enough to fully utilize an end-to-end path (e.g., the bandwidth delay product (BDP)) for a window-based scheme (or any function that combines the current window size and W_max).

The larger the ratio, the larger the rate or window cut needs to be as the rate or window is indicative of the extent of responsibility that the current connection has in contributing to the congestion event.

FIG. 1G illustrates various aspects of the disclosed embodiments. In computing network 170, a first ratio 171 is accessed. The first ratio 171 is of a sending rate limit 172 to a full line rate 173 for a link 174 in the computing network 170. A second ratio 175 is accessed. The second ratio 175 is of a sending window size 176 to W_max 177 for the link W_max 177 is a maximum allowed window size or a window size that utilizes an end-to-end path for the link 174. One or more of the first ratio 171 or second ratio 175 is used to determine an amount to reduce a sending rate or window for the link in response to an indication of network congestion in the link 174. The network node 108 can be part of a site 107 or network sites 102 in a data center, for example. Other nodes 111 of additional sites 110 may also be implemented. In some embodiments, aspects of the disclosure can be implemented in a network congestion manager 103.

Turning now to FIG. 2E, illustrated is an example operational procedure 240 for managing a computing network.

Such an operational procedure can be provided by one or more components illustrated in FIGS. 1-7. The operational procedure may be implemented in a system comprising one or more network devices or computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 240 is described as running on a system, it can be appreciated that the routine 240 and other operations described herein can be executed on an individual computing device or several devices.

Referring to FIG. 2E, operation 241 illustrates accessing a first ratio of a sending rate limit to a full line rate for a link in the computing network.

Operation 243 illustrates accessing a second ratio of a sending window size to W_max for the link, wherein W max is a maximum allowed window size or a window size that utilizes an end-to-end path for the link.

Operation 245 illustrates using one or more of the first or second ratio to determine an amount to reduce a sending rate or window for the link in response to an indication of network congestion in the link.

Scalable Coordination of Congestion Control and Adaptive Load Balancing

Congestion control is a mechanism that is intended to defuse congestion at networking bottlenecks while adaptive load balancing is a mechanism that is intended to spread traffic evenly across networks paths and prevent causing such networking bottlenecks (assuming that the overall sending rates or windows in the network have been already attenuated globally to their desired steady state values). In the case where connections (e.g., qpairs, i.e., more generally the entity at which each congestion control instance is conducted) are allowed to traverse multiple paths simultaneously (potentially with different load and congestion extents), these congestion control and load balancing mechanisms can interfere in the sense that:

1) the congestion control mechanism might overreact and over-attenuate the overall sending rate or window in such a way that the load balancing mechanism is inappropriately caused to stop attempting to improve the current sub-optimal or imbalanced traffic-to-paths distribution due to the misleading assumption that there are no hotspots that are to be avoided.

2) the load balancing mechanism can reroute the traffic frequently enough such that the congestion signals are rendered irrelevant: e.g., some portion of the traffic is signaled to be congested prior to the traffic being rerouted, which can potentially result in a congestion control overreaction unless the congestion control mechanism excludes such signals as irrelevant. Note that adaptive load balancing is conducted at a very high frequency (e.g., at the packet level), the congestion control mechanism may end up disregarding much of the congestion information even when it should not.

Tracking the set of congested paths on which a connection is multipathing can require significant resources when data traffic is load balanced at the packet level. In an embodiment, an overall connection-level measure for congestion is accumulated that is updated at the packet level and allowing congestion to activate only when that measure has exceeded a sufficiently high threshold. In one embodiment, the connection-level measure for congestion is accumulated using exponentially weighted averaging. The threshold can be determined for a given network based on analysis, experimentation, topology, and the like.

FIG. 1H illustrates various aspects of the disclosed embodiments. A computing network 180 that implementing a congestion control mechanism 186 and a load balancing mechanism, which may be implemented in a network congestion manager 181. In an embodiment, the load balancing mechanism is run at the packet level 182. A connection-level measure 183 is generated for congestion in the computing network 180. The connection-level measure 183 is accumulated at a packet level 182. activation of the congestion control mechanism 186 is limited 184 until the accumulated connection-level measure 183 reaches a threshold 185.

Figure 2F:
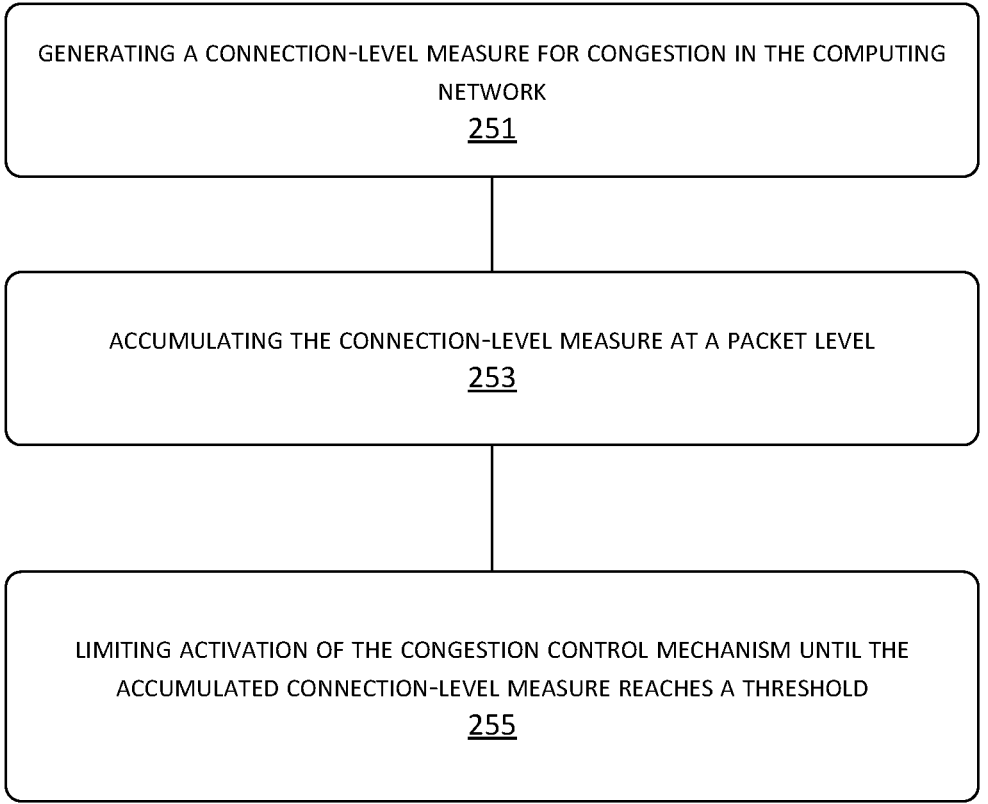

Turning now to FIG. 2F, illustrated is an example operational procedure 250 for managing a computing network implementing a congestion control mechanism and a load balancing mechanism, wherein the load balancing mechanism is run at the packet level.

Such an operational procedure can be provided by one or more components illustrated in FIGS. 1-7. The operational procedure may be implemented in a system comprising one or more network devices or computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 250 is described as running on a system, it can be appreciated that the routine 250 and other operations described herein can be executed on an individual computing device or several devices.

Referring to FIG. 2F, operation 251 illustrates generating a connection-level measure for congestion in the computing network.

Operation 253 illustrates accumulating the connection-level measure at a packet level.

Operation 255 illustrates limiting activation of the congestion control mechanism until the accumulated connection-level measure reaches a threshold.

Efficiently Coordinating Congestion Control and Adaptive Load Balancing

Congestion control is a mechanism that is intended to defuse congestion at networking bottlenecks while adaptive load balancing is a mechanism that is intended to spread traffic evenly across networks paths and prevent causing such networking bottlenecks (assuming that the overall sending rates or windows in the network have been already attenuated globally to their desired steady state values). In the case where connections (e.g., qpairs, i.e., more generally the entity at which each congestion control instance is conducted) are allowed to traverse multiple paths simultaneously (potentially with different load and congestion extents), these congestion control and load balancing mechanisms can interfere in the sense that:

1) the congestion control mechanism might overreact and over-attenuate the overall sending rate or window in such a way that the load balancing mechanism is inappropriately caused to stop attempting to improve the current sub-optimal or imbalanced traffic-to-paths distribution due to the misleading assumption that there are no hotspots that are to be avoided.

2) the load balancing mechanism can reroute the traffic frequently enough such that the congestion signals are rendered irrelevant: e.g., some portion of the traffic is signaled to be congested prior to the traffic being rerouted, which can potentially result in a congestion control overreaction unless the congestion control mechanism excludes such signals as irrelevant. Note that adaptive load balancing is conducted at a very high frequency (e.g., at the packet level), the congestion control mechanism may end up disregarding much of the congestion information even when it should not.

In an embodiment, the congestion control mechanism is prevented from being activated until most of the available routes are deemed to be congested (i.e., at the collective level across the different traversed paths). In one embodiment, the congestion information is tracked at the path level. In one example, a connection is defined to spread its traffic on a relatively small set of paths as each of these paths could get its own congestion measure, allowing for efficient determination as to whether the majority of the subpaths are congested.

FIG. 1J illustrates various aspects of the disclosed embodiments. A computing network 190 implements a congestion control mechanism and a load balancing mechanism. It is determined which available routes 191 in the network are congested 192. Congestion 192 may be determined for a network with a number of network devices or nodes which may include node A 10, node B 11, node C 12, and node D 13, and switch 1 15 and switch 2 16. Activation of the congestion control mechanism is limited until a threshold number 193 of the available routes 191 are determined to be congested 192. This prevents over-attenuation of the overall sending rate or window by the congestion control mechanism.

Turning now to FIG. 2G, illustrated is an example operational procedure 260 for managing a computing network implementing a congestion control mechanism and a load balancing mechanism.

Such an operational procedure can be provided by one or more components illustrated in FIGS. 1-7. The operational procedure may be implemented in a system comprising one or more network devices or computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 260 is described as running on a system, it can be appreciated that the routine 260 and other operations described herein can be executed on an individual computing device or several devices.

Referring to FIG. 2G, operation 261 illustrates determining which available routes in the network are congested.

Operation 263 illustrates limiting activation of the congestion control mechanism until a threshold number of the available routes are determined to be congested, thereby preventing over-attenuation of the overall sending rate or window by the congestion control mechanism.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

Furthermore, one or more of the provided operations may also be executed in parallel and/or interleaved when processing multiple network packets.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 200 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the routine 200 may be also implemented in other ways. In addition, one or more of the operations of the routine 200 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 3:
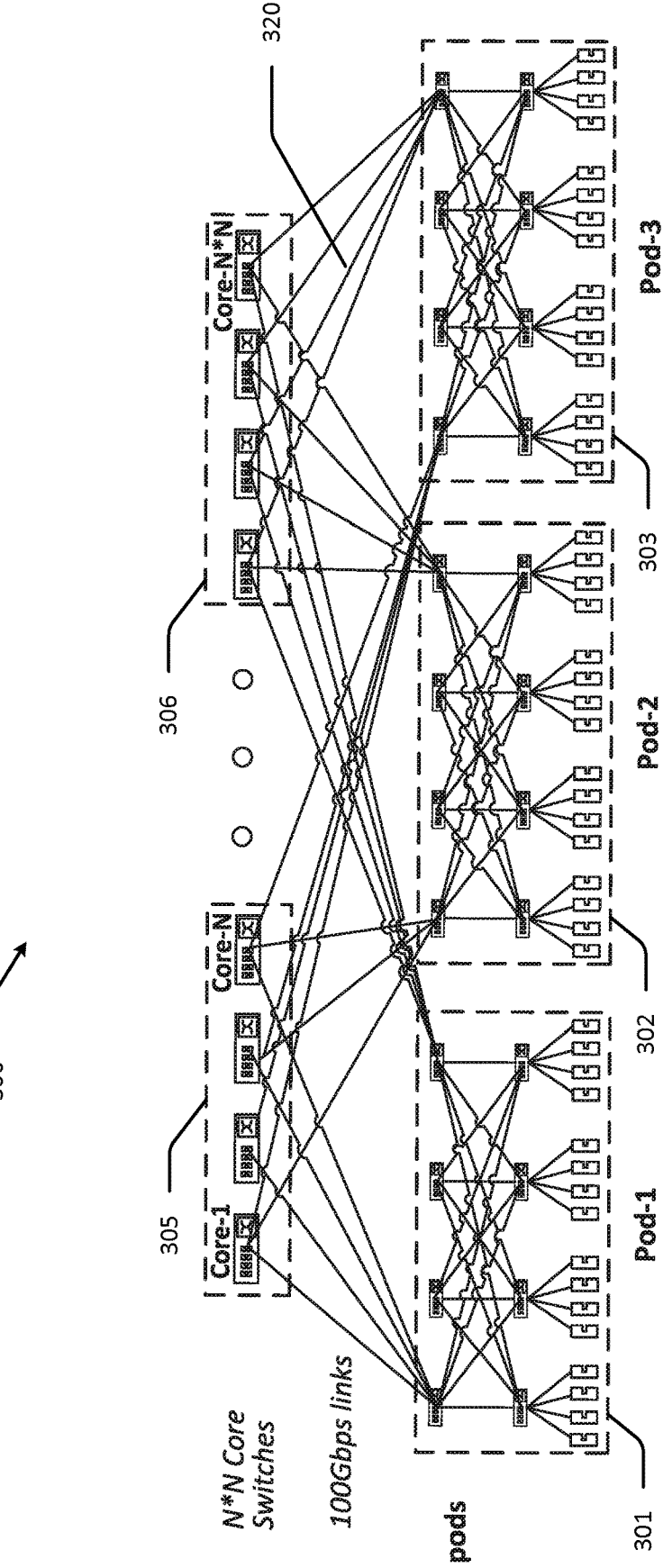
FIG. 3 is a diagram illustrating an example architecture in accordance with the present disclosure.

FIG. 3 illustrates an example communications network environment 300 containing N*N core switches such as Core-1 305 through Core N*N 306. The N*N core switches are communicatively coupled, in this example, to three pods 301, 302, 303 via 100 Gbps links 320. In an example, each pod can include set of computing nodes and network devices that are configured to run containers or virtual machines.

FIG. 4 illustrates an example communications network environment 400 containing a first communication node A 402, a second communication node B 404, a third communication node C 406, and a fourth communication node D 408. In addition, each node is configured with an associated routing table A-D 412-418. Each routing table contains data defining paths with which a node can route data from itself to other nodes within the network. It should be understood that the routing tables can be populated through any method such as static routing or dynamic routing. Furthermore, the routing tables can be modified automatically by the nodes themselves or manually such as by a system engineer.

Figure 5:
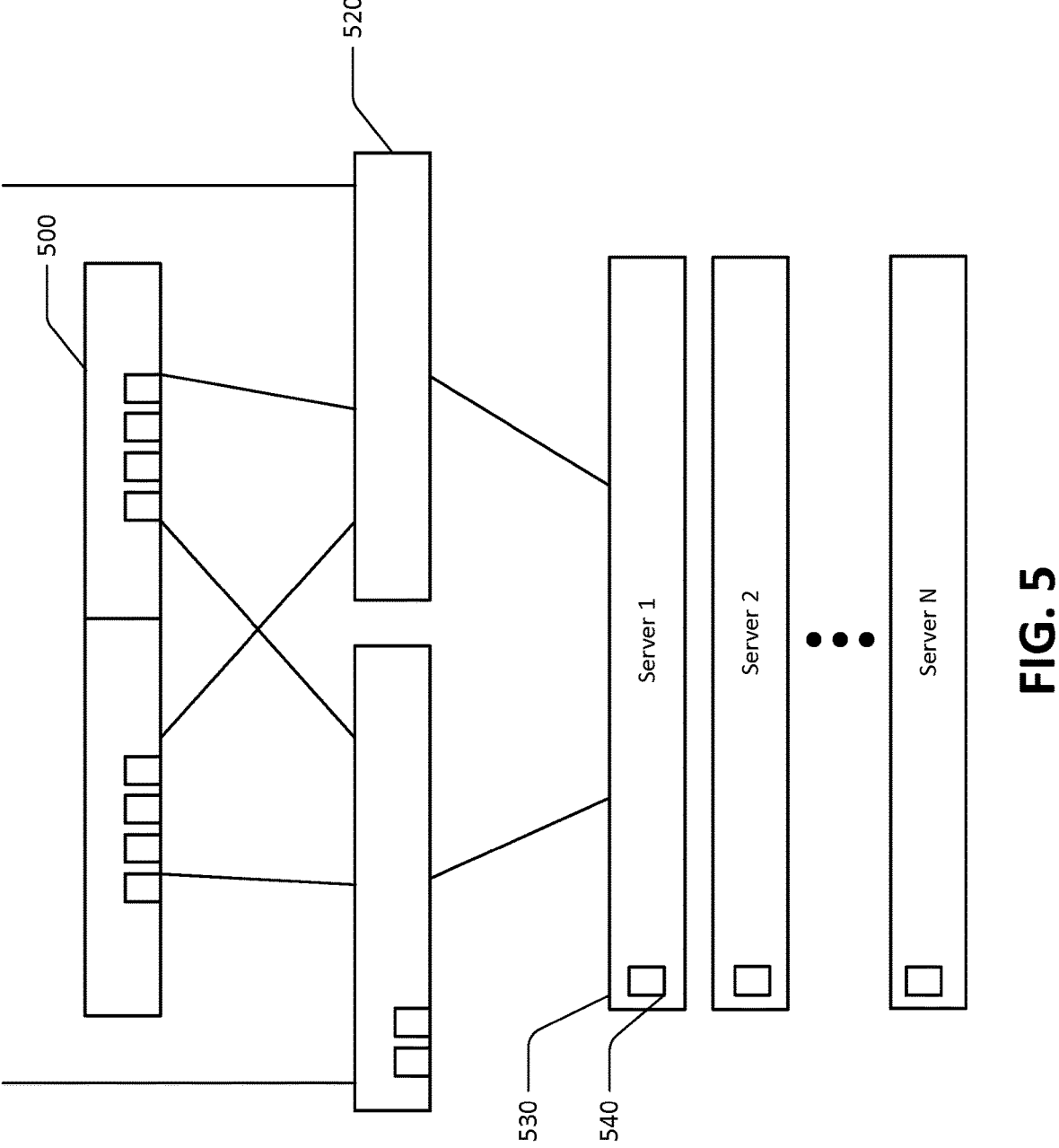
FIG. 5 is a diagram illustrating an example architecture in accordance with the present disclosure.

With reference to FIG. 5, illustrated is an example network topology. In one implementation, various network devices may be configured to provide data to servers (hosts) 530. In an embodiment, each network device 520 may be fully connected to each server 530. FIG. 5 also shows that network device 520 may be coupled to additional network devices 500. The servers 530 may include NICs 540 for providing network connectivity. The various embodiments disclosed herein can be implemented in NICs 540, network device 520, servers 530, or other devices in a computing network.

Figure 6:
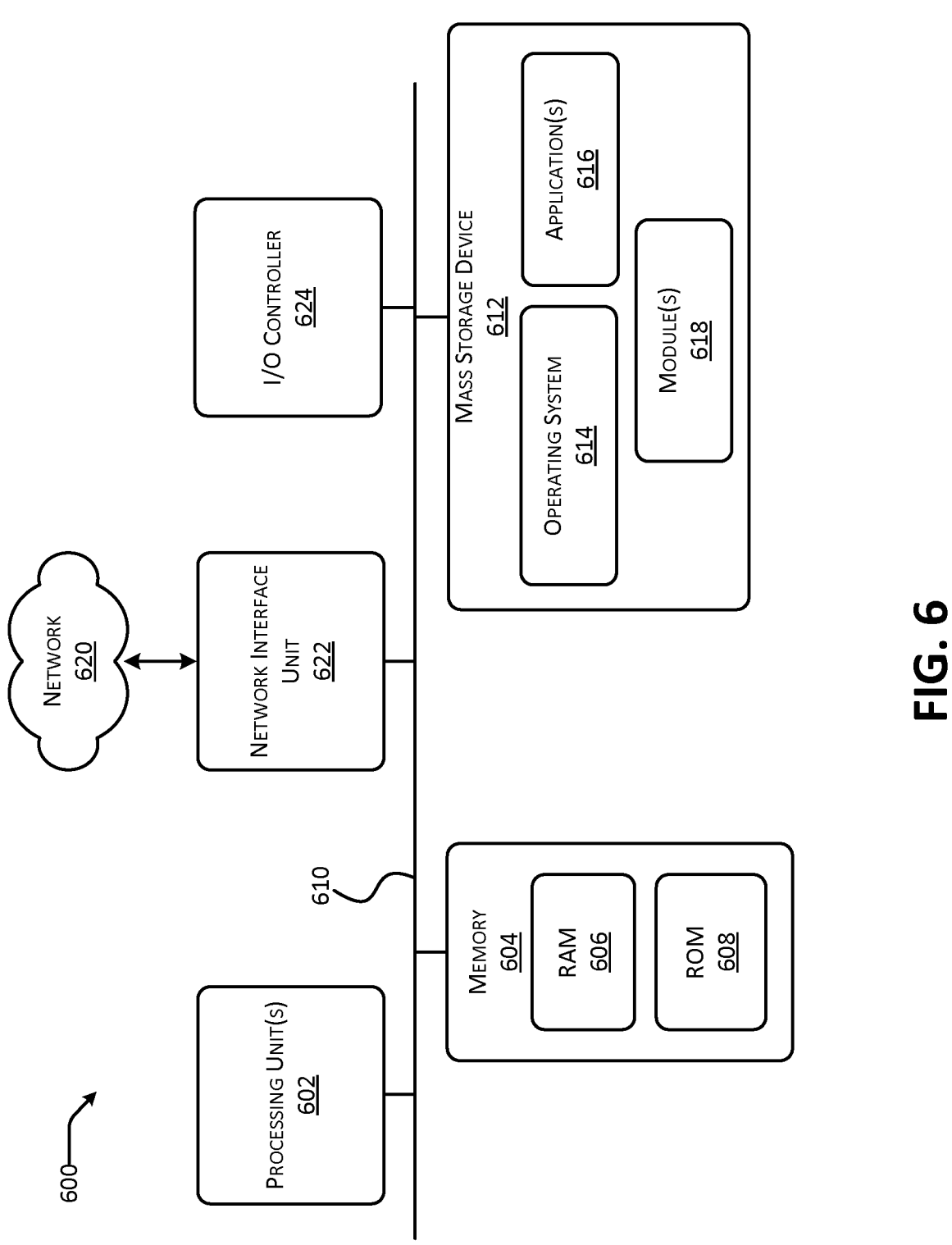
FIG. 6 is an example computing system in accordance with the present disclosure.

FIG. 6 shows additional details of an example computer architecture 600 for a device, such as a computer or a server configured as part of a cloud-based platform or system, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

Figure 7:
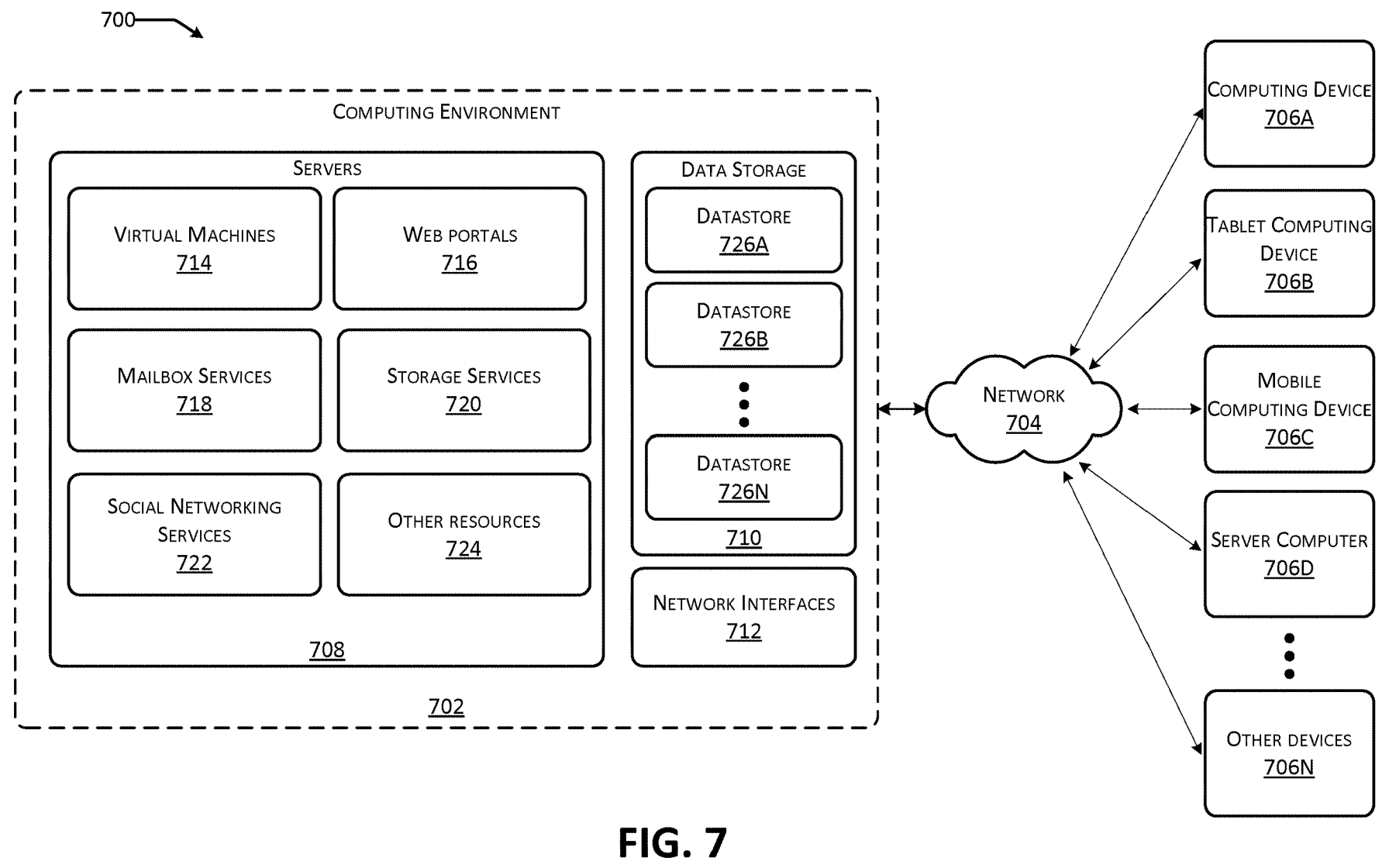

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 708 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein encompasses the subject matter set forth in the following example clauses.

Clause 1: A method for managing a computing network, the method comprising:

determining, by a network device of the computing network, that a computing node is contributing to a network congestion event;

in response to the determining, causing generation of a congestion notification message;

determining a timing profile for sending the congestion notification message based on a level of the network congestion event; and based on the timing profile, forwarding the congestion notification message to the computing node determined to be contributing to the network congestion even.

Clause 2: The method of clause 1, wherein the congestion notification message is probabilistically generated based on a congestion measure.

Clause 3: The method of any of clauses 1-2, wherein a frequency with which the congestion notification message is sent is varied proportionally as a function of the level of the network congestion event.

Clause 4: The method of any of clauses 1-3, wherein the level of the network congestion event is based on queue length.

Clause 5: The method of any of clauses 1-4, wherein the timing profile is a Weighted Random profile.

Clause 6: The method of any of clauses 1-5, wherein congestion notification message is probabilistically generated based on a queue occupancy in a linear fashion.

Clause 7: The method of any of clauses 1-6, wherein the congestion notification message is probabilistically generated based on a queue occupancy in a varied or non-linear approach.

Clause 8: The method of any of clauses 1-7, wherein the frequency is increased when the level of the network congestion event exceeds a threshold.

Clause 9: The method of any of clauses 1-8, further comprising setting an Explicit Congestion Notification (ECN) bit for a data packet that has triggered a Back-to-Sender (BTS) message, wherein future queues do not trigger an additional BTS message when the ECN bit is set, except when the data packet is dropped.

Clause 10: The method of any of clauses 1-9, wherein the BTS message further comprises one or more of a relative queue size, a number of active output flows, total transmitted bytes on port or queue combination within a switch along with a timestamp for that snapshot, cumulative buffer occupancy at the port or buffer level, or queue size gradient.

Clause 11: A system for managing a computing network, the system comprising a network device and computing node, the system configured to perform operations comprising:

determining, by a network device of the computing network, that a computing node is contributing to a network congestion event;

in response to the determining, causing generation of a congestion notification message;

determining a timing profile for sending the congestion notification message based on a level of the network congestion event; and based on the timing profile, forwarding the congestion notification message to the computing node determined to be contributing to the network congestion event.

Clause 12 The system of clause 11, wherein the congestion notification message is probabilistically generated based on a congestion measure.

Clause 13: The system of any of clauses 11 and 12, wherein a frequency with which the congestion notification message is sent is varied proportionally as a function of the level of the network congestion event.

Clause 14: The system of any clauses 12-13, wherein the level of the network congestion event is based on queue length.

Clause 15: The system of any clauses 11-14, wherein the congestion notification message is probabilistically generated based on a queue occupancy in a linear fashion.

Clause 16: The system of any clauses 11-15, wherein the congestion notification message is probabilistically generated based on a queue occupancy in a varied or non-linear approach.

Clause 17: The system of any clauses 11-16, wherein the frequency is increased when the level of the network congestion event exceeds a threshold.

Clause 18: The system of any clauses 11-17, further comprising setting an Explicit Congestion Notification (ECN) bit for a data packet that has triggered a Back-to-Sender (BTS) message, wherein future queues do not trigger an additional BTS message when the ECN bit is set, except when the data packet is dropped.

Clause 19: The system of any clauses 11-18, wherein the BTS message further comprises one or more of a relative queue size, a number of active output flows, total transmitted bytes on port or queue combination within a switch along with a timestamp for that snapshot, cumulative buffer occupancy at the port or buffer level, or queue size gradient.

Clause 20: A computer readable storage medium comprising computer readable instructions for managing a computing network, the computer readable instructions operable, when executed by a computing node, to perform operations comprising:

determining, by a network device of the computing network, that a computing node is contributing to a network congestion event;

in response to the determining, causing generation of a congestion notification message;

determining a timing profile for sending the congestion notification message based on a level of the network congestion event; and based on the timing profile, forwarding the congestion notification message to the computing node determined to be contributing to the network congestion event.

The disclosure presented herein encompasses the subject matter set forth in the following example clauses.

Clause 1: A method for managing a computing network implementing packet delivery contexts (PDCs), the method comprising:

generating an entropy value for a data packet to be transmitted on the computing network, the entropy value usable to select or change a network path for the data packet;

in response to receiving an acknowledgement message for the data packet, saving the entropy value in a storage structure if the entropy value is acknowledged as not congested; and when transmitting an additional data packet, reusing an oldest saved entropy from the data structure and invalidating the oldest saved entropy value.

Clause 2: The method of clause 1, wherein the entropy value is a bit, value, or signal that corresponds to a network route and is usable to select or change a network path as indicated to a device on the computing network.

Clause 3: The method of any of clauses 1-2, wherein packets with a same entropy take a same path, and packets with different entropies take different paths.

Clause 4: The method of any of clauses 1-3, wherein the entropy value is generated randomly or using round-robin across a list or range of entropies.

Clause 5: The method of any of clauses 1-4, wherein a new entropy value is a next one in the list or deterministically changed or incremented.

Clause 6: The method of any of clauses 1-5, wherein the data structure is a circular FIFO.

Clause 7: The method of any of clauses 1-6, wherein when there are no valid entropy values to reuse, a different entropy value is used.

Clause 8: The method of any of clauses 1-7, wherein when there are no more transmissions for a connection, good entropies observed per the last batch of ACKs are buffered.

Clause 9: The method of any of clauses 1-8, wherein saved entropy values are used when a connection is flagged as recurrent where good entropy values can be valid for the same connection at a later time when the connection resumes transmission along a same set of other recurrent connections.

Clause 10: The method of any of clauses 1-9, wherein the circular FIFO buffer is dynamically allocated within a data structure and shared across all or a subset of connections on a NIC.

Clause 11: A system for managing a computing network implementing packet delivery contexts (PDCs), the system comprising a network device and computing node, the system configured to perform operations comprising:

generating an entropy value for a data packet to be transmitted on the computing network, the entropy value usable to select or change a network path for the data packet;

in response to receiving an acknowledgement message for the data packet, saving the entropy value in a storage structure if the entropy value is acknowledged as not congested; and when transmitting an additional data packet, reusing an oldest saved entropy from the data structure and invalidating the oldest saved entropy value.

Clause 12 The system of clause 11, wherein the entropy value is a bit, value, or signal that corresponds to a network route and is usable to select or change a network path as indicated to a device on the computing network, and packets with a same entropy take a same path, and packets with different entropies take different paths.

Clause 13: The system of any of clauses 11 and 12, wherein the entropy value is generated randomly or using round-robin across a list or range of entropies.

Clause 14: The system of any clauses 12-13, wherein a new entropy value is a next one in the list or deterministically changed or incremented.

Clause 15: The system of any clauses 11-14, wherein the data structure is a circular FIFO.

Clause 16: The system of any clauses 11-15, wherein when there are no valid entropy values to reuse, a different entropy value is used.

Clause 17: The system of any clauses 11-16, wherein when there are no more transmissions for a connection, good entropies observed per the last batch of ACKs are buffered.

Clause 18: The system of any clauses 11-17, wherein saved entropy values are used when a connection is flagged as recurrent where good entropy values can be valid for the same connection at a later time when the connection resumes transmission along a same set of other recurrent connections.

Clause 19: The system of any clauses 11-18, wherein the circular FIFO buffer is dynamically allocated within a data structure and shared across all or a subset of connections on a NIC.

Clause 20: A computer readable storage medium comprising computer readable instructions for managing a computing network implementing packet delivery contexts (PDCs), the computer readable instructions operable, when executed by a computing node, to perform operations comprising:

generating an entropy value for a data packet to be transmitted on the computing network, the entropy value usable to select or change a network path for the data packet;

in response to receiving an acknowledgement message for the data packet, saving the entropy value in a storage structure if the entropy value is acknowledged as not congested; and when transmitting an additional data packet, reusing an oldest saved entropy from the data structure and invalidating the oldest saved entropy value.

The disclosure presented herein encompasses the subject matter set forth in the following example clauses.

Clause 1: A method for managing a computing network, the method comprising:

accessing acknowledgement messages for a link in the computing network;

accessing round trip time (RTT) measurements for the link; and in response to determining that none of the acknowledgement messages are Explicit Congestion Notification (ECN)-marked and none of the accessed RTT measurements exceeded a minimum expected latency threshold:

determining that an end-to-end path of the link is not congested.

Clause 2: The method of clause 1, further comprising in response to determining that an end-to-end path of the link is not congested, determining that it is safe for a connection to increase its rate or window to better utilize its end-to-end path.

Clause 3: The method of any of clauses 1-2, wherein accessing acknowledgement messages comprises observing all acknowledgements at the connection level within a window epoch for window-based congestion control mechanisms.

Clause 4: The method of any of clauses 1-3, wherein accessing acknowledgement messages comprises observing all acknowledgements at the connection level within a time period for rate-based congestion control mechanism).

Clause 5: The method of any of clauses 1-4, wherein the minimum expected latency threshold is programmable as a function of one of a topology, MTU size, or link speed.

Clause 6: The method of any of clauses 1-5, further comprising initiating a bandwidth recovery operation in response to determining that the end-to-end path of the link is not congested.

Clause 7: The method of any of clauses 1-6, wherein the bandwidth recovery operation is TCP slow-start or a variant thereof.

Clause 8: A system for managing a computing network, the system comprising a network device and computing node, the system configured to perform operations comprising:

accessing acknowledgement messages for a link in the computing network;

accessing round trip time (RTT) measurements for the link; and in response to determining that none of the acknowledgement messages are Explicit Congestion Notification (ECN)-marked and none of the accessed RTT measurements exceeded a minimum expected latency threshold:

determining that an end-to-end path of the link is not congested.

Clause 9: The system of clause 8, further comprising in response to determining that an end-to-end path of the link is not congested, determining that it is safe for a connection to increase its rate or window to better utilize its end-to-end path.

Clause 10: The system of any of clauses 8 and 9, wherein accessing acknowledgement messages comprises observing all acknowledgements at the connection level within a window epoch for window-based congestion control mechanisms.

Clause 11: The system of any clauses 8-10, wherein accessing acknowledgement messages comprises observing all acknowledgements at the connection level within a time period for rate-based congestion control mechanism).

Clause 12: The system of any clauses 8-11, wherein the minimum expected latency threshold is programmable as a function of one of a topology, MTU size, or link speed.

Clause 13: The system of any clauses 8-12, further comprising initiating a bandwidth recovery operation in response to determining that the end-to-end path of the link is not congested.

Clause 14: The system of any clauses 8-13, wherein the bandwidth recovery operation is TCP slow-start.

Clause 15: A computer readable storage medium comprising computer readable instructions for managing a computing network, the computer readable instructions operable, when executed by a computing node, to perform operations comprising:

accessing acknowledgement messages for a link in the computing network;

accessing round trip time (RTT) measurements for the link; and in response to determining that none of the acknowledgement messages are Explicit Congestion Notification (ECN)-marked and none of the accessed RTT measurements exceeded a minimum expected latency threshold:

determining that an end-to-end path of the link is not congested.

Clause 16: The computer readable storage medium of clause 15, further comprising in response to determining that an end-to-end path of the link is not congested, determining that it is safe for a connection to increase its rate or window to better utilize its end-to-end path.

Clause 17: The computer readable storage medium of any of clauses 15 and 16, wherein accessing acknowledgement messages comprises observing all acknowledgements at the connection level within a window epoch for window-based congestion control mechanisms.

Clause 18: The computer readable storage medium of any clauses 15-17, wherein accessing acknowledgement messages comprises observing all acknowledgements at the connection level within a time period for rate-based congestion control mechanism).

Clause 19: The computer readable storage medium of any clauses 15-18, wherein the minimum expected latency threshold is programmable as a function of one of a topology, MTU size, or link speed.

Clause 20: The computer readable storage medium of any clauses 15-19, further comprising initiating a bandwidth recovery operation in response to determining that the end-to-end path of the link is not congested.

The disclosure presented herein encompasses the subject matter set forth in the following example clauses.

Clause 1: A method for managing a computing network implementing packet delivery contexts (PDCs), the method comprising:

receiving, by a network device of the computing network, a data packet;

in response to determining that a previous PDC entry was not entered, returning a Receiver Not Ready (RNR) message;

in response to determining that a previous PDC entry exists and a first message for the entry has arrived, updating a receive context for the entry to indicate that the packet was received; and in response to determining that the PDC entry has received all associated packets, removing the PDC entry and notifying a sender of the associated packets that all packets have been received.

Clause 2: The method of clause 1, wherein when a PDC entry is removed the PDC entry is completed at the receiver, maintaining match information, buffer address, and information about pertaining to what has been committed to host memory.

Clause 3: A method for managing a computing network implementing packet delivery contexts (PDCs), the method comprising:

receiving a data packet;

using a match table to match a concatenation of a source address of the data packet and a consecutive message sequence number (MSN) to a match data structure;

inserting, by a semantic layer, the matched concatenation into the match data structure based on a source and a running counter for a MSN to each source;

attaching, by a NIC, a currently active PDC associated with the source, or atomically creating and attaching an empty PDC;

in response to a packet arriving before the semantic layer has posted a recv( ), atomically inserting, by the arriving packet, a canary value "failed match" into the match data structure and sending a request to wait (RTW) message to the source; and in response to the semantic layer posting the recv( ):

identifying, by the semantic layer, the "failed match" entry in the match data structure, atomically updating the "failed match" entry with match information, and sending a request to send (RTS) message to the source.

Clause 4: The method of clause 3, wherein the source re-starts message transmission from the packet in response to receiving the RTS message.

Clause 5: The method of any of clauses 3-4, wherein the source stops all messages to the target process in response to receiving the RTW message or only the current message.

Clause 6: The method of any of clauses 3-5, wherein RTS messages are retransmitted by a PDC layer if the PDC does not receive a data message from the source within a specified time.

Clause 7: The method of any of clauses 3-6, wherein the sender implements a state machine for each message that starts in a "sending" state when the semantic layer submits a send, and a state of the state machine transitions to "done" when all ACKs are received.

Clause 8: The method of any of clauses 3-7, wherein the state transitions to "waiting" when an RTW is received and transitions to "sending" when an RTS is received.

Clause 9: The method of any of clauses 3-8, wherein while in a "sending" state, each packet is transmitted by the PDC using its own state machine with CC/LB and retransmission logic.

Clause 10: The method of any of clauses 3-9, wherein the state transitions to "complete" when all ACKs are received.

Clause 11: The method of any of clauses 3-10, wherein the receiver's state machine is captured in a state of the MTD for each recv.

Clause 12: The method of any of clauses 3-11, wherein a recv state becomes "posted" when its corresponding match is added to the MTD and during packet reception.

Clause 13: The method of any of clauses 3-12, wherein the state is "nonexistent" if a message arrives before the message is posted, and wherein the state is "complete" when all data is received.

Clause 14: The method of any of clauses 3-13, wherein the sender sends a data stream of its current window size and the receiver fetches remaining data from the source when the recv is posted.

Clause 15: A system for managing a computing network implementing packet delivery contexts (PDCs), the system comprising a network device and computing node, the system configured to perform operations comprising;

receiving a data packet;

using a match table to match a concatenation of a source address of the data packet and a consecutive message sequence number (MSN) to a match data structure;

inserting, by a semantic layer, the matched concatenation into the match data structure based on a source and a running counter for a MSN to each source;

attaching, by a NIC, a currently active PDC associated with the source, or atomically creating and attaching an empty PDC;

in response to a packet arriving before the semantic layer has posted a recv( ), atomically inserting, by the arriving packet, a canary value "failed match" into the match data structure and sending a request to wait (RTW) message to the source; and in response to the semantic layer posting the recv( ):

identifying, by the semantic layer, the "failed match" entry in the match data structure, atomically updating the "failed match" entry with match information, and sending a request to send (RTS) message to the source.

Clause 16: The system of clause 15, wherein the source re-starts message transmission from the packet in response to receiving the RTS message.

Clause 17: The system of any of clauses 15 and 16, wherein the source stops all messages to the target process in response to receiving the RTW message or only the current message.

Clause 18: The system of any clauses 15-17, wherein RTS messages are retransmitted by a PDC layer if the PDC does not receive a data message from the source within a specified time.

Clause 19: The system of any clauses 15-18, wherein the state transitions to "waiting" when an RTW is received and transitions to "sending" when an RTS is received.

Clause 20: The system of any of clauses 15-19, wherein:

the state transitions to "waiting" when an RTW is received and transitions to "sending" when an RTS is received;

while in a "sending" state, each packet is transmitted by the PDC using its own state machine with CC/LB and retransmission logic;

the state transitions to "complete" when all ACKs are received;

the receiver's state machine is captured in a state of the MTD for each recv;

a recv state becomes "posted" when its corresponding match is added to the MTD and during packet reception;

the state is "nonexistent" if a message arrives before the message is posted;

the state is "complete" when all data is received the state transitions to "waiting" when an RTW is received and transitions to "sending" when an RTS is received.

The disclosure presented herein encompasses the subject matter set forth in the following example clauses.

Clause 1: A method for managing a computing network, the method comprising:

accessing a first ratio of a sending rate limit to a full line rate for a link in the computing network;

accessing a second ratio of a sending window size to W_max for the link, wherein W_max is a maximum allowed window size or a window size that utilizes an end-to-end path for the link; and using one or more of the first or second ratio to determine an amount to reduce a sending rate or window for the link in response to an indication of network congestion in the link.

Clause 2: The method of clause 1, wherein the full line rate is for network interface card (NIC) speed.

Clause 3: The method of any of clauses 1-2, wherein the first ratio is for a function that combines the current rate limit and the full line rate.

Clause 4: The method of any of clauses 1-3, wherein the W_max is a function of the bandwidth delay product (BDP).

Clause 5: The method of any of clauses 1-4, wherein the second ratio is for a window-based scheme or a rate-based scheme.

Clause 6: The method of any of clauses 1-5, wherein the second ratio is for a function that combines the current window size and W_max.

Clause 7: The method of any of clauses 1-6, wherein the sending rate or window is indicative of an amount that a current connection is contributing to the network congestion.

Clause 8: A system for managing a computing network, the system comprising a network device and computing node, the system configured to perform operations comprising:

accessing a first ratio of a sending rate limit to a full line rate for a link in the computing network;

accessing a second ratio of a sending window size to W_max for the link, wherein W_max is a maximum allowed window size or a window size that utilizes an end-to-end path for the link; and using one or more of the first or second ratio to determine an amount to reduce a sending rate or window for the link in response to an indication of network congestion in the link.

Clause 9: The system of clause 8, wherein the full line rate is for network interface card (NIC) speed.

Clause 10: The system of any of clauses 8 and 9, wherein the first ratio is for a function that combines the current rate limit and the full line rate.

Clause 11: The system of any clauses 8-10, wherein the W_max is the bandwidth delay product (BDP).

Clause 12: The system of any clauses 8-11, wherein the second ratio is for a window-based scheme.

Clause 13: The system of any clauses 8-12, wherein the second ratio is for a function that combines the current window size and W_max.

Clause 14: The system of any clauses 8-13, wherein the sending rate or window is indicative of an amount that a current connection is contributing to the network congestion.

Clause 15: A computer readable storage medium comprising computer readable instructions for managing a computing network, the computer readable instructions operable, when executed by a computing node, to perform operations comprising:

accessing a first ratio of a sending rate limit to a full line rate for a link in the computing network;

accessing a second ratio of a sending window size to W_max for the link, wherein W_max is a maximum allowed window size or a window size that utilizes an end-to-end path for the link; and using one or more of the first or second ratio to determine an amount to reduce a sending rate or window for the link in response to an indication of network congestion in the link.

Clause 16: The computer readable storage medium of clause 15, wherein the full line rate is for network interface card (NIC) speed.

Clause 17: The computer readable storage medium of any of clauses 15 and 16, wherein the first ratio is for a function that combines the current rate limit and the full line rate.

Clause 18: The computer readable storage medium of any clauses 15-17, wherein the W_max is the bandwidth delay product (BDP).

Clause 19: The computer readable storage medium of any clauses 15-18, wherein wherein the second ratio is for a window-based scheme.

Clause 20: The computer readable storage medium of any clauses 15-19, wherein the second ratio is for a function that combines the current window size and W_max.

The disclosure presented herein encompasses the subject matter set forth in the following example clauses.

Clause 1: A method for managing a computing network implementing a congestion control mechanism and a load balancing mechanism, wherein the load balancing mechanism is run at the packet level, the method comprising:

generating a connection-level measure for congestion in the computing network;

accumulating the connection-level measure at a packet level; and limiting activation of the congestion control mechanism until the accumulated connection-level measure reaches a threshold.

Clause 2: The method of clause 1, wherein the connection-level measure is accumulated using exponentially weighted averaging.

Clause 3: The method of any of clauses 1-2, wherein the threshold is determined for the computing network based on analysis.

Clause 4: The method of any of clauses 1-3, wherein the threshold is determined for the computing network based on experimentation.

Clause 5: The method of any of clauses 1-4, wherein the threshold is determined for the computing network based on topology.

Clause 6: The method of any of clauses 1-5, wherein connections in the computing network are allowed to traverse multiple paths simultaneously.

Clause 7: The method of any of clauses 1-6, wherein connections in the computing network are qpairs.

Clause 8: A system for managing a computing network implementing a congestion control mechanism and a load balancing mechanism, the system comprising a network device and computing node, the system configured to perform operations comprising:

generating a connection-level measure for congestion in the computing network;

accumulating the connection-level measure at a packet level; and limiting activation of the congestion control mechanism until the accumulated connection-level measure reaches a threshold.

Clause 9: The system of clause 8, wherein the connection-level measure is accumulated using exponentially weighted averaging.

Clause 10: The system of any of clauses 8 and 9, wherein the threshold is determined for the computing network based on analysis.

Clause 11: The system of any clauses 8-10, wherein the threshold is determined for the computing network based on experimentation.

Clause 12: The system of any clauses 8-11, wherein the threshold is determined for the computing network based on topology.

Clause 13: The system of any clauses 8-12, wherein connections in the computing network are allowed to traverse multiple paths simultaneously.

Clause 14: The system of any clauses 8-13, wherein connections in the computing network are qpairs.

Clause 15: A computer readable storage medium comprising computer readable instructions for managing a computing network implementing a congestion control mechanism and a load balancing mechanism, the computer readable instructions operable, when executed by a computing node, to perform operations comprising:

generating a connection-level measure for congestion in the computing network;

accumulating the connection-level measure at a packet level; and limiting activation of the congestion control mechanism until the accumulated connection-level measure reaches a threshold.

Clause 16: The computer readable storage medium of clause 15, wherein the connection-level measure is accumulated using exponentially weighted averaging.

Clause 17: The computer readable storage medium of any of clauses 15 and 16, wherein the threshold is determined for the computing network based on analysis.

Clause 18: The computer readable storage medium of any clauses 15-17, wherein the threshold is determined for the computing network based on experimentation.

Clause 19: The computer readable storage medium of any clauses 15-18, wherein the threshold is determined for the computing network based on topology.

Clause 20: The computer readable storage medium of any clauses 15-19, wherein connections in the computing network are allowed to traverse multiple paths simultaneously.

The disclosure presented herein encompasses the subject matter set forth in the following example clauses.

Clause 1: A method for managing a computing network implementing a congestion control mechanism and a load balancing mechanism, the method comprising:
determining which available routes in the network are congested; and
limiting activation of the congestion control mechanism until a threshold number of the available routes are determined to be congested, thereby preventing over-attenuation of the overall sending rate or window by the congestion control mechanism.

Clause 2: The method of clause 1, wherein the threshold number of the available routes are determined to be congested at a collective level across traversed paths.

Clause 3: The method of any of clauses 1-2, wherein congestion information is tracked at a path level.

Clause 4: The method of any of clauses 1-3, wherein a connection is defined to spread its traffic on a relatively small set of paths.

Clause 5: The method of any of clauses 1-4, wherein the threshold is determined for the computing network based on topology, analysis, or experimentation.

Clause 6: The method of any of clauses 1-5, wherein connections in the computing network are allowed to traverse multiple paths simultaneously.

Clause 7: The method of any of clauses 1-6, wherein the connections in the computing network are qpairs.

Clause 8: A system for managing a computing network implementing a congestion control mechanism and a load balancing mechanism, the system comprising a network device and computing node, the system configured to perform operations comprising:
determining which available routes in the network are congested; and
limiting activation of the congestion control mechanism until a threshold number of the available routes are determined to be congested, thereby preventing over-attenuation of the overall sending rate or window by the congestion control mechanism.

Clause 9: The system of clause 8, wherein the threshold number of the available routes are determined to be congested at a collective level across traversed paths.

Clause 10: The system of any of clauses 8 and 9, wherein congestion information is tracked at a path level.

Clause 11: The system of any clauses 8-10, wherein a connection is defined to spread its traffic on a relatively small set of paths.

Clause 12: The system of any clauses 8-11, wherein the threshold is determined for the computing network based on topology, analysis, or experimentation.

Clause 13: The system of any clauses 8-12, wherein connections in the computing network are allowed to traverse multiple paths simultaneously.

Clause 14: The system of any clauses 8-13, wherein the connections in the computing network are qpairs.

Clause 15: A computer readable storage medium comprising computer readable instructions for managing a computing network implementing a congestion control mechanism and a load balancing mechanism, the computer readable instructions operable, when executed by a computing node, to perform operations comprising:
determining which available routes in the network are congested; and
limiting activation of the congestion control mechanism until a threshold number of the available routes are determined to be congested, thereby preventing over-attenuation of the overall sending rate or window by the congestion control mechanism.

Clause 16: The computer readable storage medium of clause 15, wherein the threshold number of the available routes are determined to be congested at a collective level across traversed paths.

Clause 17: The computer readable storage medium of any of clauses 15 and 16, wherein congestion information is tracked at a path level.

Clause 18: The computer readable storage medium of any clauses 15-17, wherein a connection is defined to spread its traffic on a relatively small set of paths.

Clause 19: The computer readable storage medium of any clauses 15-18, wherein connections in the computing network are allowed to traverse multiple paths simultaneously.

Clause 20: The computer readable storage medium of any clauses 15-19, wherein the connections in the computing network are qpairs.

The invention claimed is:

1. A method for managing a computing network, the method comprising:
accessing acknowledgement messages for a link in the computing network;
for each of the acknowledgement messages, inspecting an IP header to determine whether any of the acknowledgement messages are Explicit Congestion Notification (ECN)-marked;
accessing round trip time (RTT) measurements for the link;
in response to determining both that:
the acknowledgement messages are not Explicit Congestion Notification (ECN)-marked; and
the accessed RTT measurements did not exceed a minimum expected latency threshold:
determining that an end-to-end path of the link is uncongested.

2. The method of claim 1, further comprising in response to determining that an end-to-end path of the link is uncongested, determining that it is safe for a connection to increase its rate or window to better utilize its end-to-end path.

3. The method of claim 1, wherein accessing acknowledgement messages comprises observing all acknowledgements at a connection level within a window epoch for window-based congestion control mechanisms.

4. The method of claim 1, wherein accessing acknowledgement messages comprises observing all acknowledgements at a connection level within a time period for rate-based congestion control mechanism.

5. The method of claim 1, wherein the minimum expected latency threshold is programmable as a function of one of a topology, MTU size, or link speed.

6. The method of claim 1, further comprising initiating a bandwidth recovery operation in response to determining that the end-to-end path of the link is uncongested.

7. The method of claim 6, wherein the bandwidth recovery operation is TCP slow-start.

8. A system for managing a computing network, the system comprising a network device and computing node, the system configured to perform operations comprising:

accessing acknowledgement messages for a link in the computing network;

for each of the acknowledgement messages, inspecting an IP header to determine whether any of the acknowledgement messages are Explicit Congestion Notification (ECN)-marked;

accessing round trip time (RTT) measurements for the link;

in response to determining both that:

the acknowledgement messages are not Explicit Congestion Notification (ECN)-marked; and the accessed RTT measurements did not exceed a minimum expected latency threshold:

determining that an end-to-end path of the link is not congested.

9. The system of claim 8, further comprising in response to determining that an end-to-end path of the link is not congested, determining that it is safe for a connection to increase its rate or window to better utilize its end-to-end path.

10. The system of claim 8, wherein accessing acknowledgement messages comprises observing all acknowledgements at a connection level within a window epoch for window-based congestion control mechanisms.

11. The system of claim 8, wherein accessing acknowledgement messages comprises observing all acknowledgements at a connection level within a time period for rate-based congestion control mechanism.

12. The system of claim 8, wherein the minimum expected latency threshold is programmable as a function of one of a topology, MTU size, or link speed.

13. The system of claim 8, further comprising initiating a bandwidth recovery operation in response to determining that the end-to-end path of the link is not congested.

14. The system of claim 13, wherein the bandwidth recovery operation is TCP slow-start.

15. A non-transitory computer readable storage medium comprising computer readable instructions for managing a computing network, the computer readable instructions operable, when executed by a computing node, to perform operations comprising:

accessing acknowledgement messages for a link in the computing network;

for each of the acknowledgement messages, inspecting an IP header to determine whether any of the acknowledgement messages are Explicit Congestion Notification (ECN)-marked;

accessing round trip time (RTT) measurements for the link;

in response to determining both that:

the acknowledgement messages are not Explicit Congestion Notification (ECN)-marked; and the accessed RTT measurements did not exceed a minimum expected latency threshold:

determining that an end-to-end path of the link is not congested.

16. The non-transitory computer readable storage medium of claim 15, further comprising in response to determining that an end-to-end path of the link is not congested, determining that it is safe for a connection to increase its rate or window to better utilize its end-to-end path.

17. The non-transitory computer readable storage medium of claim 15, wherein accessing acknowledgement messages comprises observing all acknowledgements at a connection level within a window epoch for window-based congestion control mechanisms.

18. The non-transitory computer readable storage medium of claim 15, wherein accessing acknowledgement messages comprises observing all acknowledgements at a connection level within a time period for rate-based congestion control mechanism.

19. The non-transitory computer readable storage medium of claim 15, wherein the minimum expected latency threshold is programmable as a function of one of a topology, MTU size, or link speed.

20. The non-transitory computer readable storage medium of claim 15, further comprising initiating a bandwidth recovery operation in response to determining that the end-to-end path of the link is not congested.

* * * * *